United States Patent

Matsui

[11] Patent Number: 6,137,521
[45] Date of Patent: *Oct. 24, 2000

[54] INFORMATION RECORDING APPARATUS AND INFORMATION RECORDING METHOD

[75] Inventor: Shinzo Matsui, Uenoharamachi, Japan

[73] Assignee: Olympus Optical Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/872,426

[22] Filed: Jun. 10, 1997

[30] Foreign Application Priority Data

Jun. 17, 1996 [JP] Japan .................................. 8-155222

[51] Int. Cl.⁷ .................................................. G41B 20/18
[52] U.S. Cl. .......................................... 347/225; 371/37.1
[58] Field of Search ..................................... 347/208, 225, 347/262, 264, 16, 41, 42, 166; 371/6, 40.1, 37.1; 369/32, 33; 400/22; 235/494

[56] References Cited

U.S. PATENT DOCUMENTS

| | | | |
|---|---|---|---|
| 4,344,713 | 8/1982 | Cullen | 400/22 |
| 5,170,179 | 12/1992 | Chen et al. | 347/208 |
| 5,633,663 | 5/1997 | Matsubara et al. | 347/41 |
| 5,719,886 | 2/1998 | Matsui et al. | 371/40.1 |
| 5,724,364 | 3/1998 | Mori et al. | 371/6 |
| 5,757,393 | 5/1998 | Suzuki | 347/16 |
| 5,896,403 | 4/1999 | Nagasaki et al. | 371/37.1 |

FOREIGN PATENT DOCUMENTS 0 670 555 A1  9/1995  European Pat. Off. .

*Primary Examiner*—N. Le
*Assistant Examiner*—Hai C. Pham
*Attorney, Agent, or Firm*—Frishauf, Holtz, Goodman, Langer & Chick, P.C.

[57] ABSTRACT

A CPU converts multimedia information, which has been input from a multimedia information input unit, to an optically readable dot code, and prints the dot code on an information recording medium by means of a recording head. In this case, a control unit moves the recording head in a first direction of the information recording medium, and moves the information recording medium and recording head relative to each other in a second direction perpendicular to the first direction. When the dot code, which is spatially independent, is to be recorded on the information recording medium, the CPU controls the control unit such that the dot code is recorded only by a single one-way scan operation of the recording head unit in the first direction, without moving the information recording medium and the recording head unit relative to each other in the second direction.

19 Claims, 20 Drawing Sheets

RECORD PIXEL NUMBER CORRESPONDING TO HEAD
SCAN LENGTH = DIVISION IMAGE PIXEL LENGTH 28

RECORD PIXEL
NUMBER
CORRESPONDING TO
HEAD SCAN WIDTH
= DIVISION IMAGE
PIXEL WIDTH 30

```
0000000000000100000000011110000000000
0000000000011100000000010001000000000
0000000000010010000000001000011000000000
0000000001000010000000010111000000000
0000000001111111000000100110000000000
0000000010000000100000100000110000000
0000000100000000010000111111100000000
0000000000000000000000000000000000000
```

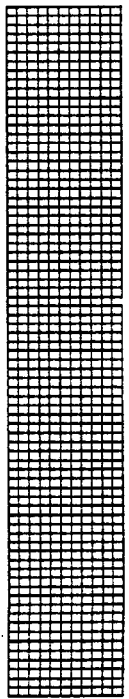
FIG. 5A (PRIOR ART)
170
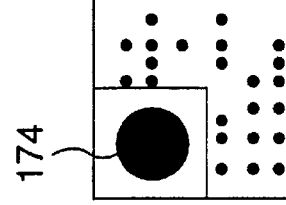
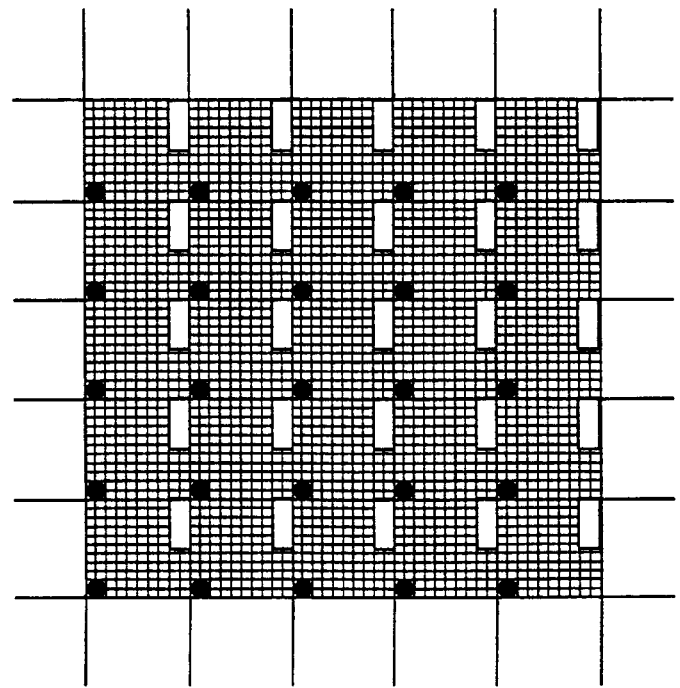
FIG. 5B (PRIOR ART)
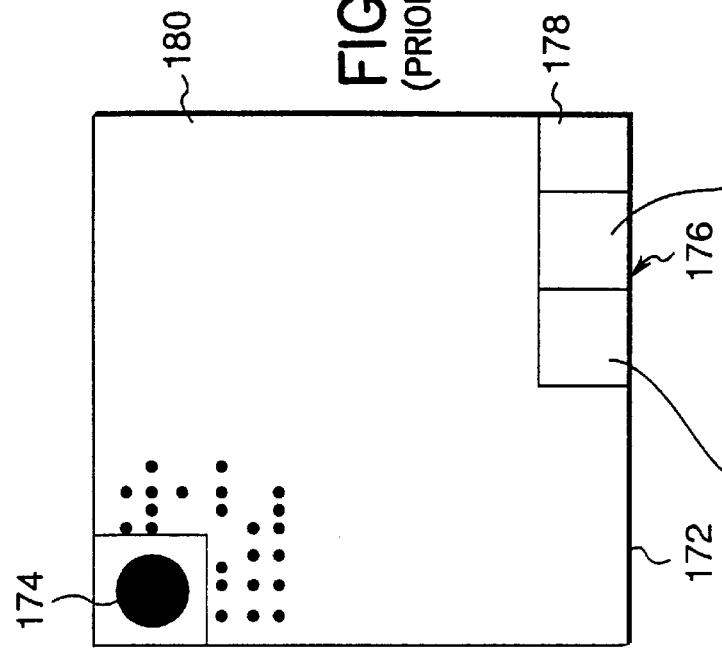
FIG. 5C (PRIOR ART)
172, 174, 176, 178, 180
X ADDRESS
Y ADDRESS
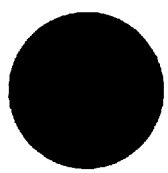
FIG. 5D (PRIOR ART)
DOT

SEPARATED

TWO DIVISIONAL
IMAGES OVERLAPPING

DISPLACED

DESIRED CODE WIDTH × CODE LENGTH
> CONVERSION CODE WIDTH × CONVERSION
CODE LENGTH

DESIRED CODE WIDTH × CODE LENGTH
< CONVERSION CODE WIDTH × CONVERSION
CODE LENGTH

| PAPER QUALITY | | DOT PITH & DOT DIAMETER |
|---|---|---|
| SPECIALITY PAPER | SYNTHETIC PAPER | 84 μm OR MORE |
| COATED PAPER | COAT PAPER | 126 μm OR MORE |
| | LIGHTWEIGHT-COATED PAPER | 126 μm OR MORE |
| | SLIGHT-COATED PAPER | 169 μm OR MORE |
| UNCOATED PAPER | WOODFREE PAPER | 169 μm OR MORE |
| | MECHANICAL PAPER | 211 μm OR MORE |
| | GROUNDWOOD PAPER | 295 μm OR MORE |

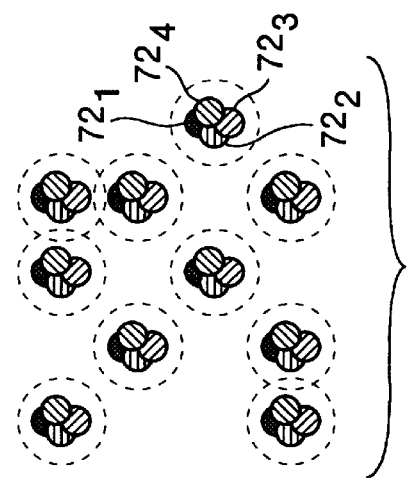
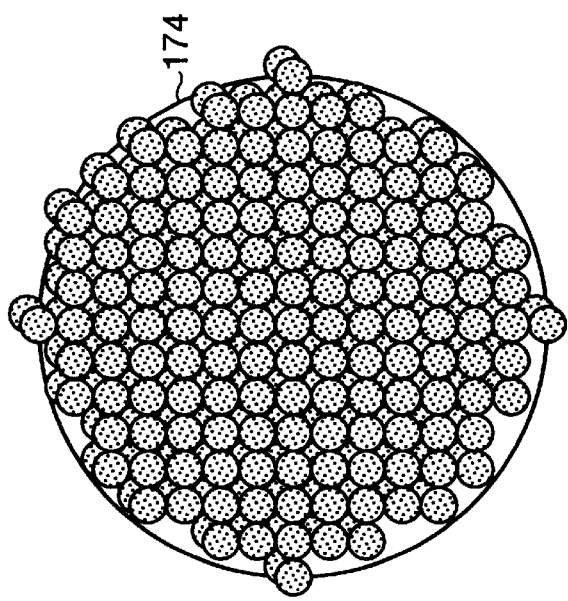
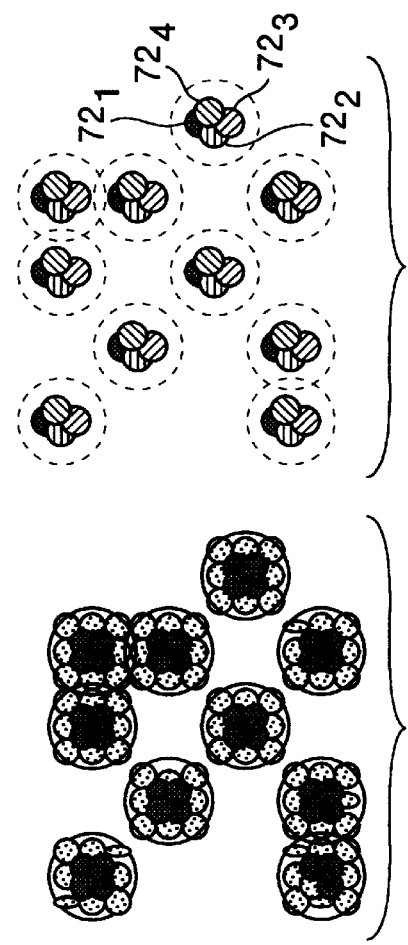
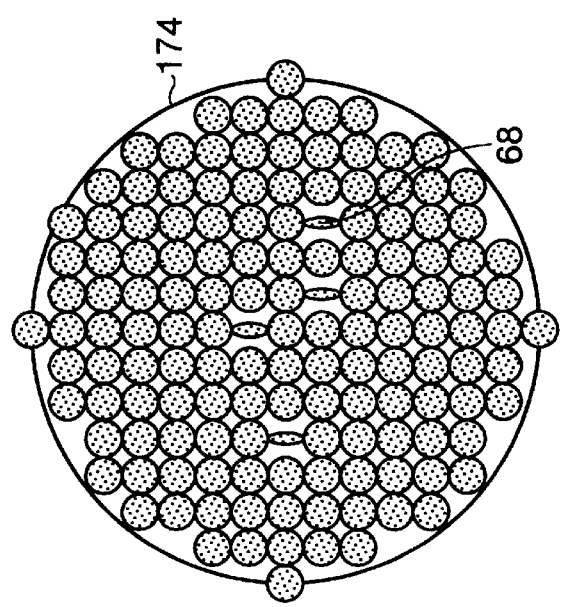
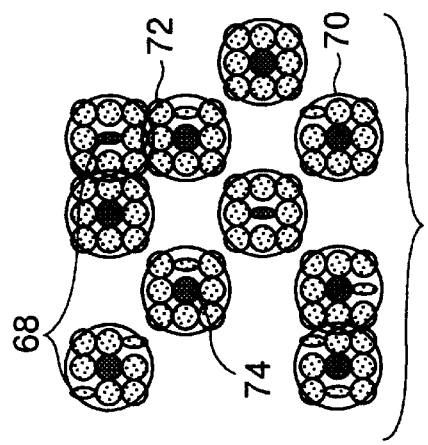

INFORMATION RECORDING APPARATUS AND INFORMATION RECORDING METHOD

BACKGROUND OF THE INVENTION

The present invention relates to an information recording apparatus and an information recording method for recording so-called multimedia information, including audio information such as a speech or music, video information obtained from a camera or a video device and digital code data obtained from a personal computer or a word processor, on an information recording medium such as paper in the form of an optically readable two-dimensional code pattern.

A printer apparatus has widely been used as means for recording information on a recording medium such as paper.

Such a printer apparatus generally comprises a CPU 10, a ROM 12, a sheet record information input unit 14, a RAM 16, and a printer engine 18.

The CPU 10 controls the entire printer apparatus. The ROM 12 stores programs for the CPU 10 and parameters for setting operations. The sheet record information input unit 14 is used to input sheet record information to be recorded on an information recording medium sheet, for example, characters, figures, tables, images, etc. The RAM 16 includes a record pixel information memory 16A for converting sheet record information, i.e. bit information, input from the sheet record information input unit 14, to image information, and temporarily storing the converted image information.

The printer engine 18 records the record pixel information temporarily stored in the record pixel information memory 16A on the information record medium sheet. The printer engine 18 comprises a recording head 18A and a control unit 18B for controlling the operation of the recording head 18A. The controller 18B comprises a paper sheet transfer controller for transferring paper and a head scan controller for scanning the head.

As is shown in FIG. 2, the recording head 18A includes 200 recording sections 18A1 in units of a record pixel, and each recording section 18A1 is aligned and physically fixed. A head scan controller 18B1 of the controller 18B includes guide rails and a driver for scan-driving the recording head 18A in a direction perpendicular to the direction of alignment of the recording section 18A1. The head scan controller 18B1 scan-drives the recording head 18A and records record pixels on the surface of an information record medium or paper sheet 20. A paper sheet transfer controller 18B2 of the control unit 18B moves the sheet 20, thereby effecting recording on one page.

An image recorded by single one-way scan of the recording head 18A is termed "division image 22," the head scan length in the head scan direction is "effective print length 24," and a head scan width 26 in a direction perpendicular to the head scan direction is "effective print width."

Such division image 22 is recorded several times while the sheet 20 is being moved. Thus, one-page recording is effected. For example, FIG. 3 shows an example in which an N-number of division images constitute an image on one page. Specifically, at first, a first division image $22_1$ is recorded. Then, the sheet 20 is moved by a distance corresponding to the head scan width 26, and a second division image $22_2$ is recorded. Again, the sheet 20 is moved by a distance corresponding to the head scan width 26, and a third division image $22_3$ is recorded. In this manner, the N-number of division images are recorded. That is, the recording on one page is completed when an N-th division image $22_N$ has been recorded. Thus, an image larger than the division image 22 is recorded on the surface of the sheet.

Each division image is recorded by single one-way scan of the head. After the sheet 20 is moved, the next division image is recorded. The recording of each division image and the transfer of sheet 20 are performed alternately, and thus the recording on one page is effected.

FIG. 4 shows a storage structure of the record pixel information memory 16A in the RAM 16. In the record pixel information memory 16A, a one-bit memory area is assigned to one record pixel and thus information corresponding to the record pixels of one page is stored. (It should be noted that a plurality of bits may be assigned to one record pixel.) If the storage content is "1", the associated record pixel is recorded. If the storage content is "0", the associated record pixel is not recorded. The record pixel information memory 16A has a two-dimensional arrangement, and includes an area corresponding to the division images 22. Note that the record pixel number in the scan direction of the recording head 18A is termed "division image pixel length 28," and the record pixel number corresponding to the scan width of the recording head 18A is termed "division image pixel width 30."

Conventionally, various media such as a magnetic tape or an optical disk are known as media for recording audio information such as speeches and music. Even if these media are mass-produced, the price per unit is relatively high and the space necessary for storing the media is large. A great amount of labor and time is needed when a medium recording speeches is sent to a specified person by mail or brought to him/her directly. The same applies to the case of sending so-called multimedia information including image information obtained from a camera, a video device, etc. and digital code data obtained from a personal computer, a word processor, etc.

In order to solve this problem, the assignee of the present invention proposes a recording system and a reproducing system in EP 0,670,551 A1 (corresponding to U.S. Pat. Ser. No. 08/407,018). This recording system records multimedia information, including at least one of audio information, video information and digital code data, on an information recording medium such as paper in the form of a two-dimensional code pattern in which dots are arranged two-dimensionally as image information or coded information which permits facsimile transmission and inexpensive mass-duplication, and the reproducing system reproduces the multimedia information recorded in the form of the two-dimensional code pattern.

FIG. 5A shows a dot code 170 as a two-dimensional code pattern disclosure in the aforementioned EP 0,670,555 A1. As shown in FIG. 5C, one block 172 comprises a marker 174, a block address 176, address error detection/correction data 178 and a data area 180 for writing of actual data. As shown in FIG. 5B, a plurality of blocks 172 are arranged two-dimensionally in a matrix, thus constituting the dot code 170. FIG. 5D is an enlarged view of a dot in data area 180.

FIG. 6 illustrates how the dot code 170 is recorded on the information recording medium such as paper by means of the printer apparatus which prints a one-page image by recording division images more than two times. The longitudinal direction of a dot code "1" $170_1$ is the same as the scan direction of the recording head 18A, and the longitudinal direction of a dot code "2", $170_2$ is the same as the direction of movement of the paper sheet 20. The dot code 170 is recorded at a position desired by the editor, which is represented by desired code position information 32. The desired code position information 32 is located at an upper left point of the dot code 170. Note that the width of the dot code 170 in the scan direction of the recording head 18A is termed "code length 34" and the width of the dot code 170 in the direction perpendicular to the scan direction is termed "code width 36."

When the image including the dot code 170 is printed and recorded by a printer apparatus capable of printing a one-page image by the recording of two or more division images, it is ideal that the dot 38 or line 40 is exactly aligned at a boundary line 42, as shown in FIG. 7. In fact, however, defective images, as shown in FIGS. 8A to 8C, are often produced at the boundary lines 42 of division images 22.

Specifically, in FIG. 8A, a pair of segments of the dot 38 and a pair of segments of the line 42, which appear on the two division images, are not joined and a blank portion lies between each pair of segments. In FIG. 8B, the segments of dot 38 and the segments of line 42 overlap each other at the boundary of the division images 22. In FIG. 8C, the upper division image and the lower division image are displaced horizontally.

Such defects of the images are attributable to mechanical precision of the head scan controller 18B1 and paper sheet transfer controller 18B2. As compared to an error of the recording head 18A in the main scan direction, an error of transfer control of paper 20 is large. If the precision of paper transfer control is low, such defects as are shown in FIGS. 8A and 8B will occur. If the precision of repetitive scan of the head is low, such a defect as is shown in FIG. 8C will occur.

As has been stated above, when the dot code 170 comprising plural division images is to be recorded, defects as shown in FIGS. 8A to 8C will occur. Such defects will not pose serious problems in the case of printing of characters, etc. However, if very fine dots are to be recorded, as in the case of the dot code 170, the dots will not be read and the original multimedia information cannot be reproduced.

Furthermore, if there is a blurring record pixel in the marker 174 or dots in the dot code 170, the dot will not exactly be read and the original multimedia information cannot be reproduced.

BRIEF SUMMARY OF THE INVENTION

The present invention has been made in consideration of the above circumstances, and its object is to provide an information recording apparatus and an information recording method capable of exactly recording a code and reproducing original information from the code.

According to a first aspect of the present invention, there is provided an information recording apparatus for recording, on an information recording medium, multimedia information including at least one of audio information, image information and digital code data in the form of an optically readable code, the apparatus comprising:

a recording head unit for printing a code associated with the multimedia information on the information recording medium;

driving means for moving the recording head unit in a first direction of the information recording medium, while moving the information recording medium and the recording head unit relative to each other in a second direction perpendicular to the first direction; and control means for controlling the driving means, wherein said control means controls the driving means such that when the code, which is spatially independent, is recorded on the information recording medium only by a single one-way scan operation of the recording head unit in the first direction, without moving the information recording medium and the recording head unit relative to each other in the second direction.

According to a second aspect of the present invention, there is provided an information recording apparatus for recording, on an information recording medium, multimedia information including at least one of audio information, image information and digital code data in the form of an optically readable code, the apparatus comprising:

a recording head unit for printing a code associated with the multimedia information on the information recording medium;

driving means for moving the recording head unit in a first direction of the information recording medium, while moving the information recording medium and the recording head unit relative to each other in a second direction perpendicular to the first direction; and control means for controlling the driving means, wherein said control means controls the driving means such that when the code, which is spatially independent, is recorded on the information recording medium, the same code is overprinted by a plurality of scan operations of the recording head unit in the first direction, without moving the information recording medium and the recording head unit relative to each other in the second direction.

According to a third aspect of the present invention, there is provided an information recording method for recording, on an information recording medium, multimedia information including at least one of audio information, image information and digital code data in the form of an optically readable code, the method comprising the steps of:

performing, when the code, which is spatially independent, is recorded on the information recording medium, a single one-way scan operation by moving a recording head unit for printing the code on the information recording medium in a predetermined direction; and controlling the recording of the code by the recording head unit such that the spatially independent code is recorded on the information recording medium only by said one-way scan operation.

According to a fourth aspect of the present invention, there is provided an information recording method for recording, on an information recording medium, multimedia information including at least one of audio information, image information and digital code data in the form of an optically readable code, the method comprising the steps of:

performing, when the code, which is spatially independent, is recorded on the information recording medium, a plurality of one-way scan operations by moving twice or more a recording head unit for printing the code on the information recording medium in a predetermined direction; and controlling the recording of the code by the recording head unit such that the same code is overprinted by said plurality of one-way scan operations.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 5A–5D are views showing for describing a dot code;

FIGS. 26A and 26B show relationships between markers and record pixels, for describing the operation of a second embodiment of the invention;

FIGS. 27A to 27C show relationships between information dots and record pixels, for describing the operation of the second embodiment of the invention.

DETAILED DESCRIPTION OF THE INVENTION

Embodiments of the present invention will be described below.

Figure 1:
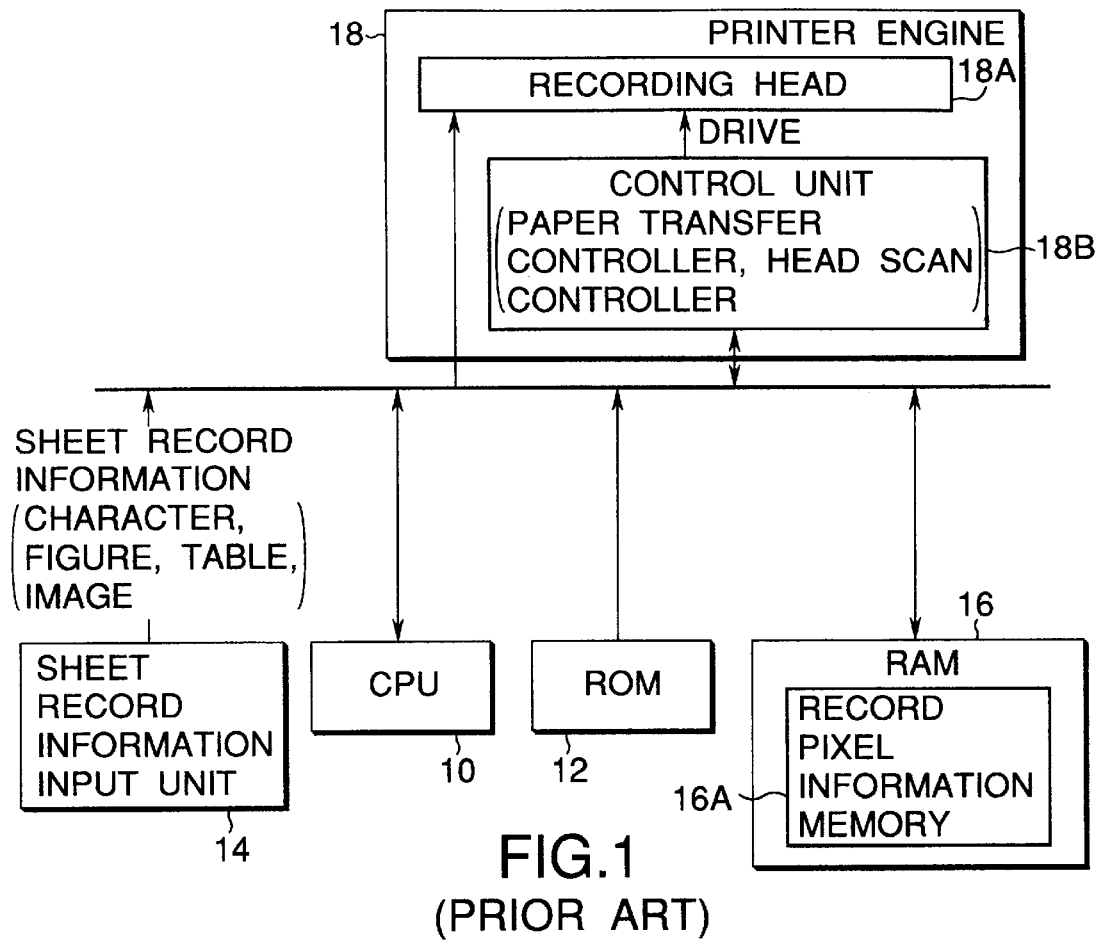
FIG. 1 is a block diagram showing a conventional printer apparatus.
Figure 2:
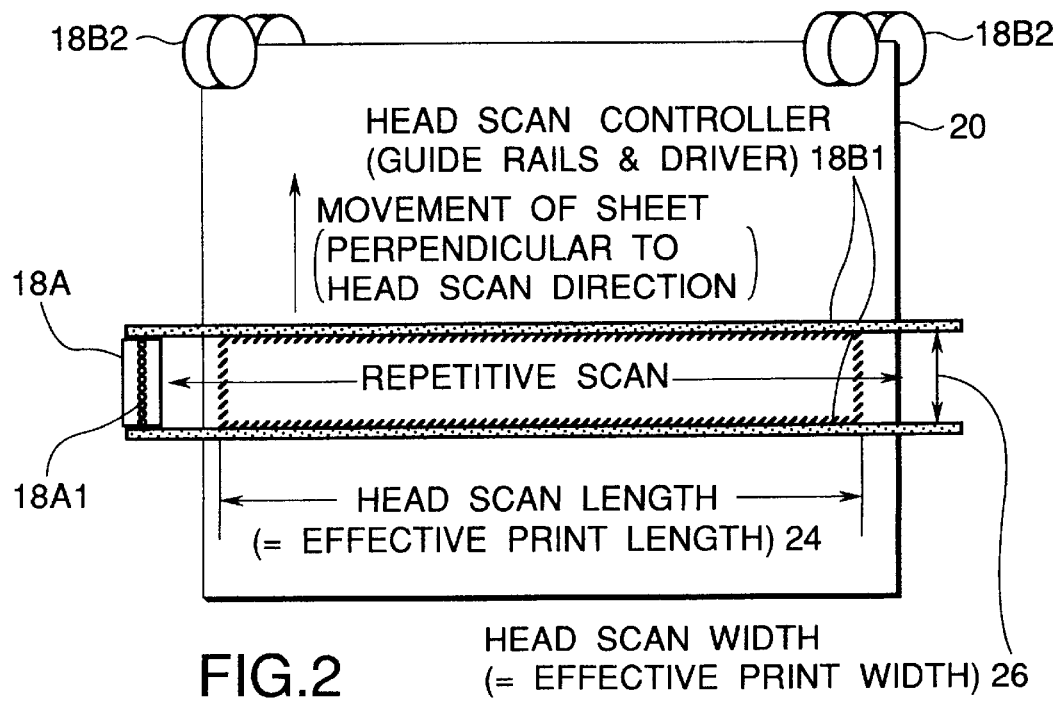
FIG. 2 shows the relationship between a recording head, on the one hand, and a head scan controller and a paper sheet transfer controller, on the other, thereby to describe a recording method of the conventional printer apparatus.
Figure 9:
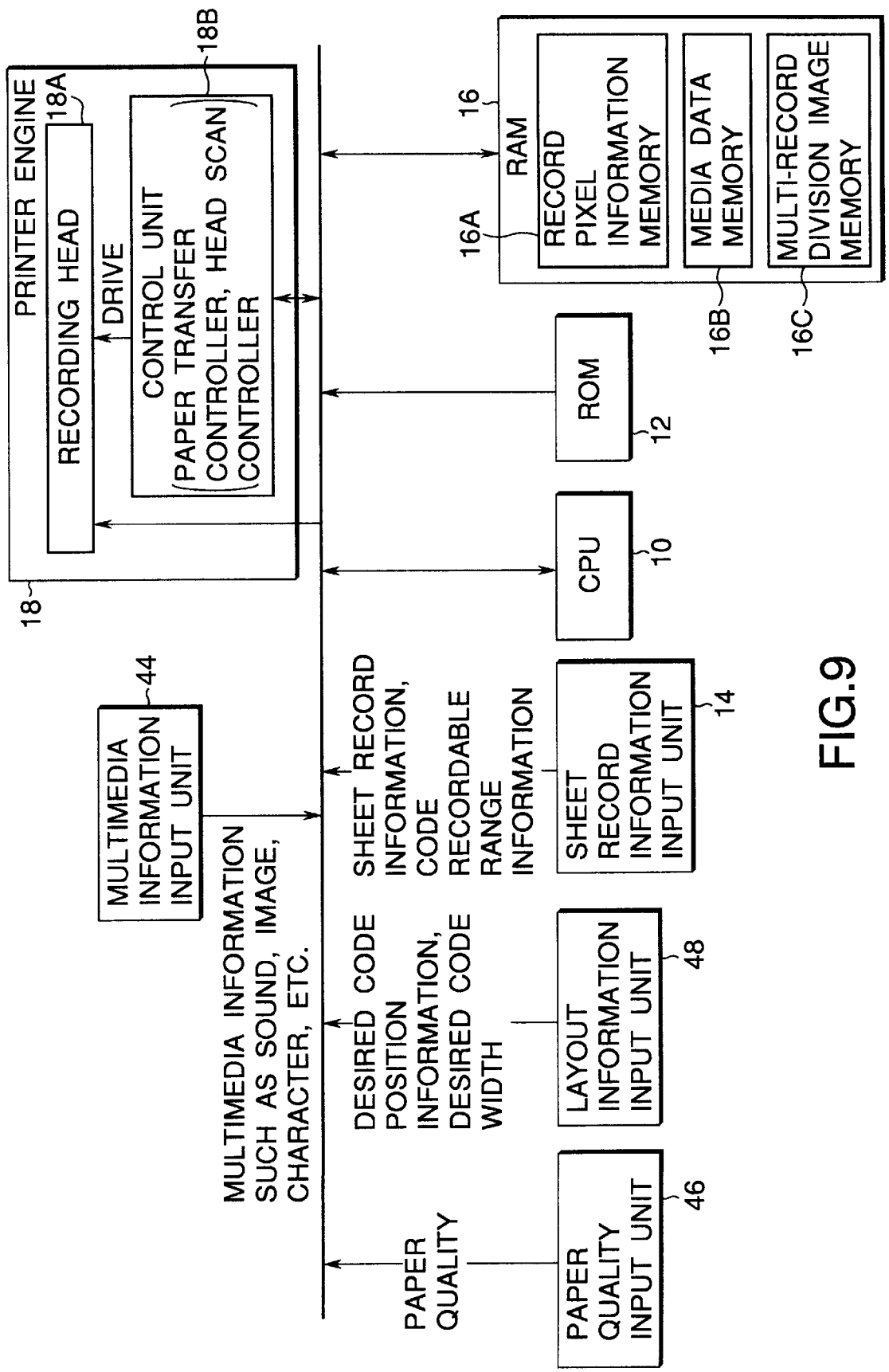
FIG. 9 is a block diagram showing the structure of an information recording apparatus according to first and second embodiments of the present invention.

FIG. 9 shows the structure of an information recording apparatus according to a first embodiment of the present invention. In the first embodiment, a dot code recording function is added to the conventional printer shown in FIG. 1. In FIG. 9, the structural elements common to those in FIG. 1 are denoted by like reference numerals, and a description thereof is omitted.

In this embodiment, the sheet record information input unit 14 is modified to input code recordable range information (to be described later) in addition to sheet record information. In addition, a media data memory 16B, in addition to the record pixel information memory 16A, is included in the RAM 16.

Furthermore, a multimedia information input unit 44, a paper quality input unit 46 and a layout information input unit 48 are provided.

The multimedia information input unit 44 is designed to input multimedia information such as sound, image and characters. The paper quality input unit 46 is designed to input information on the quality of paper or information record medium. The layout information input unit 48 is designed to input desired code position information and desired code width information.

The aforementioned code recordable range information represents a range in which a code can be recorded in relation to the sheet record information such as a character, a table, a figure or an image.

On the other hand, the media data memory 16B provided in the RAM 16 is designed to store data input from the multimedia information input unit 44.

The operation of the apparatus with the above structure will now be described.

Figure 10:
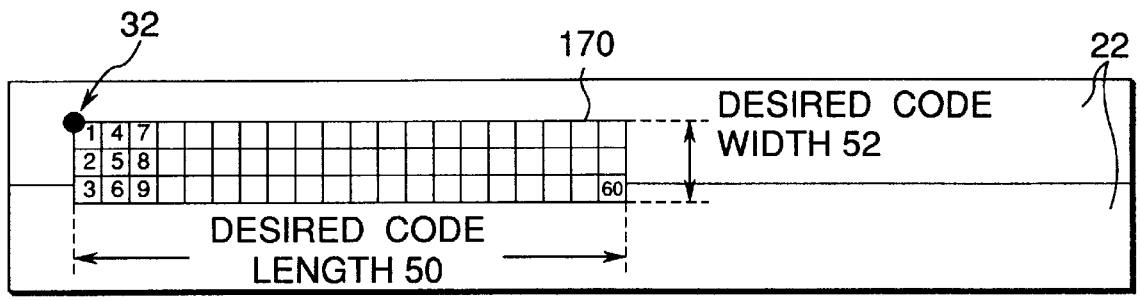
FIG. 10 shows a code to be recorded.

In FIG. 10, when a dot code 70 with a desired code length 50 and a desired code width 52 is to be recorded on the basis of desired code position information 32, it will be recorded over a plurality of division images 22. In FIG. 10, each box of the dot code 170 represents one block 172, and the number indicated in the block is block address 176. If one of the desired code length 50 and desired code width 52 is designated, the other is definitively determined on the basis of the amount of multimedia information input from the multimedia information input unit 44. In the present embodiment, the information on the desired code width 52 is input from the layout information input unit 48.

Figure 11A:
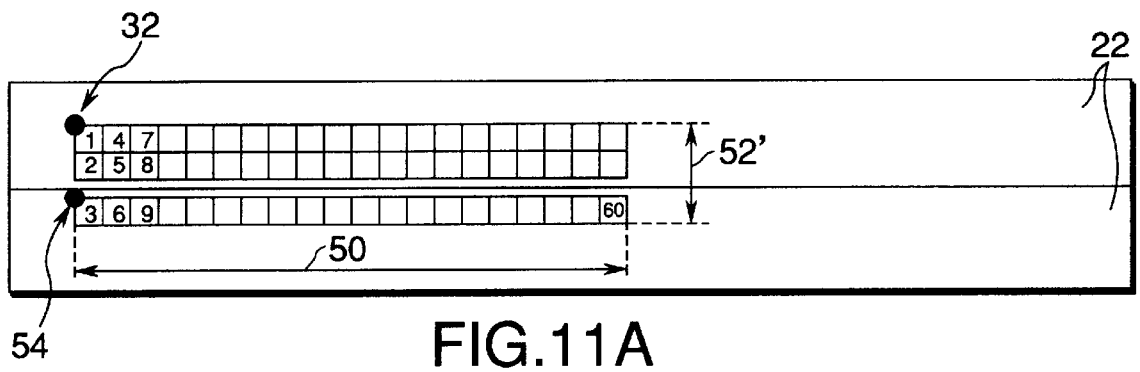
FIGS. 11A to 11C show relationships between division images and codes, for describing the operation of the first embodiment.

In the present embodiment, as shown in FIG. 11A, the dot code 170 is recorded in the state in which it is divided so that the respective divided portions of the dot code 170 are completed in the associated division images 22. In this case, the desired code position information 32 need not be changed, and a desired code width 52' is almost the same as the desired code width 52. The divided dot code is accompanied with new code position information 54 (needless to say, the new code position information 54 is not actually recorded on paper).

Figure 12:
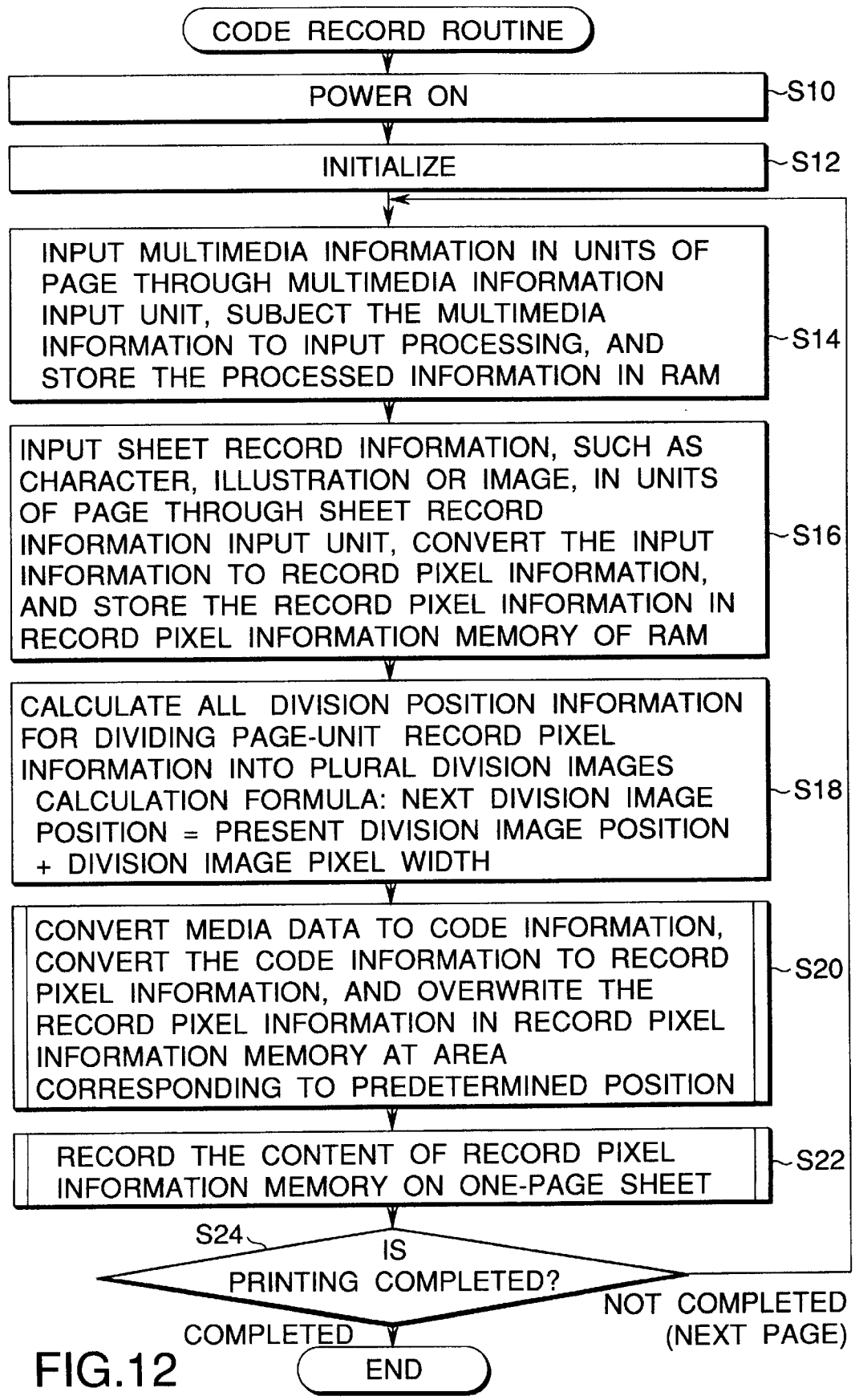
FIG. 12 is a flow chart illustrating the operation of the first embodiment.

The recording operation is carried out by the CPU 10 according to the flow chart illustrated in FIG. 12.

Power is supplied to the information recording apparatus (step S10). The apparatus is initialized (step S12). The initialization refers to electrical and mechanical initial setting. For example, the respective memories in the RAM 16 are cleared, and the controller 18B of printer engine 18 is set in the home position.

After the initialization, multimedia information for one page is put from the multimedia information input unit 44, subjected to input processing such as speech compression or image compression, and converted to media data. The media data is stored in the media data memory 16B in the RAM 16.

Sheet record information for one page, such as characters, illustration, or images, is input from the sheet record information input unit 14, converted to image information as record pixel information, and stored in the record pixel information memory 16A in the RAM 16 (step S16).

All division position information for dividing the record pixel information for one page ("page-unit record pixel information") into a plurality of division images is calculated (step S18). The equation for calculation is given by the next division image position=the present division image position+the division image pixel width.

Figures 3, 4:
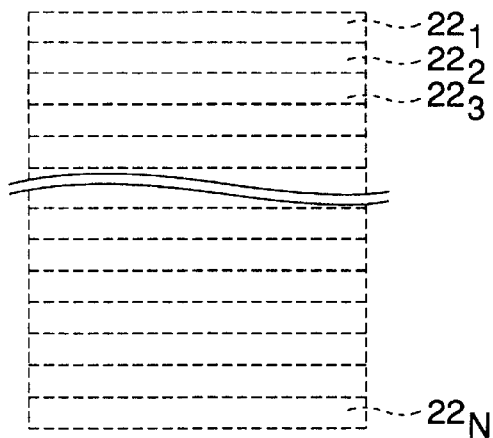
FIG. 3 i a view showing division images.
FIG. 4 shows a memory map of a record pixel information memory FIG. 1.

The division image pixel width 30 is shown in FIG. 4.

The media data, i.e. compressed speech data or compressed image data, stored in the media data memory 16B is converted to code information, and then converted to record pixel information or image information. The thus obtained data is overwritten in the record pixel information memory 16A (step S20) at an area corresponding to the predetermined position.

In this case, the code information refers to information obtained by converting the media data to a data sequence with a logical structure according to predetermined parameters. Such parameters are prewritten in the ROM 12 and include those for setting a block arrangement, an in-block dot arrangement, a dot pitch, a dot shape, etc. These parameters are copied to the RAM 16. The code information is converted to record pixel information by using the parameters stored in the RAM 16.

Such parameters to be used may be input from the layout information input unit 48 by the user and stored in the RAM 16.

The predetermined position refers to the desired code position or desired code width input from the layout information input unit 48.

The step S20 will be described later in greater detail. In brief, in step S20, the sheet record information is converted to image information and stored in the record pixel information memory 16A. Then, the code information, too, is converted to image information, i.e. record pixel information, and overwritten in the record pixel information memory 16A.

The content of the record pixel information memory 16A for one page is recorded on the paper sheet (step S22). The details of the operation in step S22 will be described later.

The end of printing is detected (step S24). If the printing has not yet been completed, the control returns to step S14 and repeats the above-described process to print the information for the next page. If the printing on all pages is completed, the entire operation of the apparatus is finished.

Figure 13:
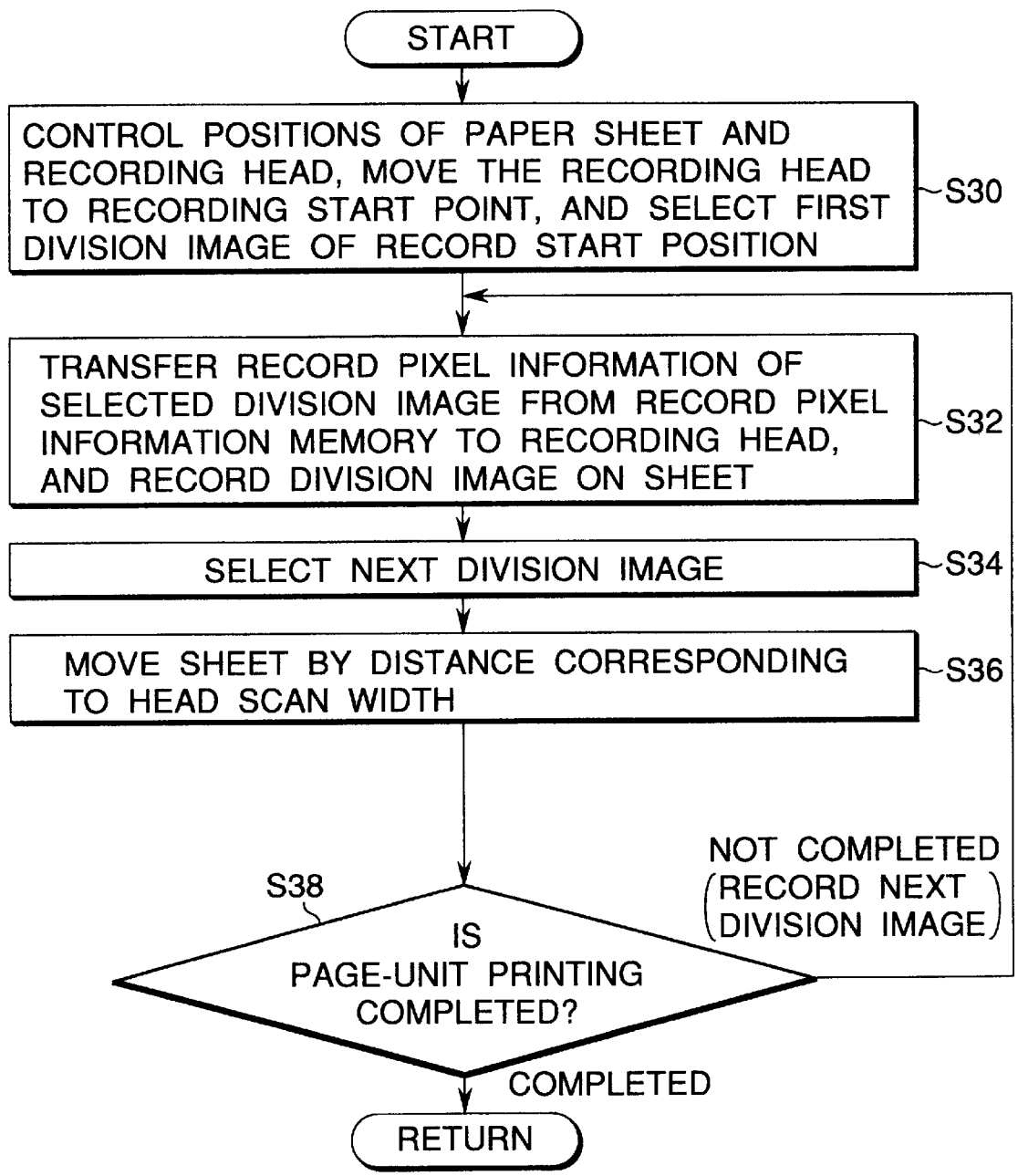
FIG. 13 is a flow chart illustrating the details of a process of recording the content of a record pixel information memory on a one-page paper sheet, in the flow chart of FIG. 12.

The operation in step S22 for recording the content of the record pixel information memory 16A on a one-page sheet will now be described with reference to FIG. 13.

At first, the positions of the paper 20 and recording head 18A are controlled by the paper sheet transfer controller 18B2 and head scan controller 18B1. Thus, the recording head 18A is moved to the record beginning position. For example, in the case of a thermal transfer type printer, an ink ribbon cartridge is selected and set in a recordable state at a predetermined position. Then, a first division image at the record beginning position is selected (step S30).

Subsequently, the record pixel information or image information of the selected division image is transferred from the record pixel information memory 16A to the recording head 18A, and the division image is recorded on the paper sheet by means of the printer engine 18 (step S32). In this case, the recording head 18A performs one-way scan and records the record pixels on the sheet as an image.

After the division image is recorded, the next division image is selected (step S34) and the paper sheet 20 is moved by the paper sheet transfer controller 18B2 by a distance corresponding to the head scan width 26 (step S36).

It is determined whether the printing for one page has been completed (step S38). If not, the control returns to step S32 to record and print the next division image selected in step S34. If the printing for one page is finished, the control goes to step S24.

Figure 14:
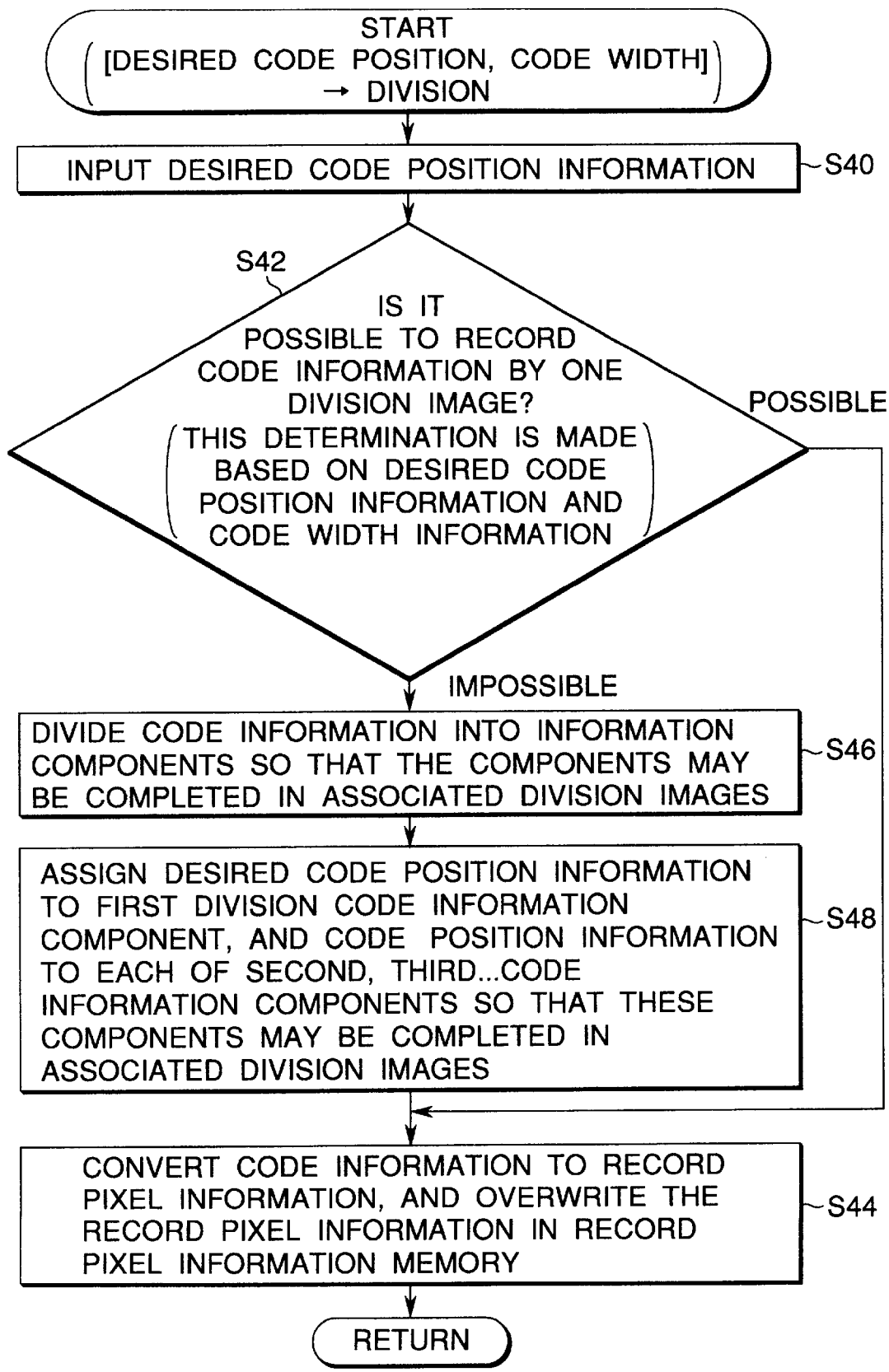
FIG. 14 is a flow chart illustrating the details of a process of converting media data, mentioned in the flow chart of FIG. 12, to code information, converting the code information to record pixel information, and overwriting the record pixel information on a predetermined position in the record pixel information memory, thereby effecting the recording shown in FIG. 11A.

With reference to the flow chart of FIG. 14, a description will be given of the operation in step S20 for converting the media data to code information, converting the code information to record pixel information and overwriting the record pixel information in the record pixel information memory at a storage area associated with the predetermined position.

The layout editor inputs, by means of the layout information input unit 48, desired code position information 32 representing the position on the page where the dot code 170 is to be recorded, as well as desired code width 52 (step S40). Accordingly, the CPU 10 converts the media data stored in the media data memory 16B to code information, as disclosed in EP 0,670,555 A1 filed by the assignee of the present invention. On the basis of the input desired code position information 32 and desired code width 52, it is determined whether the converted code information can be recorded by one division image (step S42).

If the converted code information can be recorded by one division image, the converted code information is converted to record pixel information and overwritten in the record pixel information memory 16A for sheet record information (step S44). Thus, this process is finished and the control returns to the upper-level flow chart.

On the other hand, if the converted code information cannot be recorded by one division image, the code information is divided into code information components so that the divided code information components are completed in associated division images (step S46). The desired code position information 32 is assigned to the first division code information, and code position information component 54 is assigned to each of the second, third, . . . , code information components so that these code information components are completed in associated division images (step S48).

The control advances to step S44, and each code information component is converted to code pixel information and overwritten in the record pixel information memory 16A. Thus, this process is completed and the control returns to the upper-level flow chart.

In this manner, one dot code 170 is divided into dot code components so that the divided components are completed in associated division images 22 and then printed.

Figure 11B:
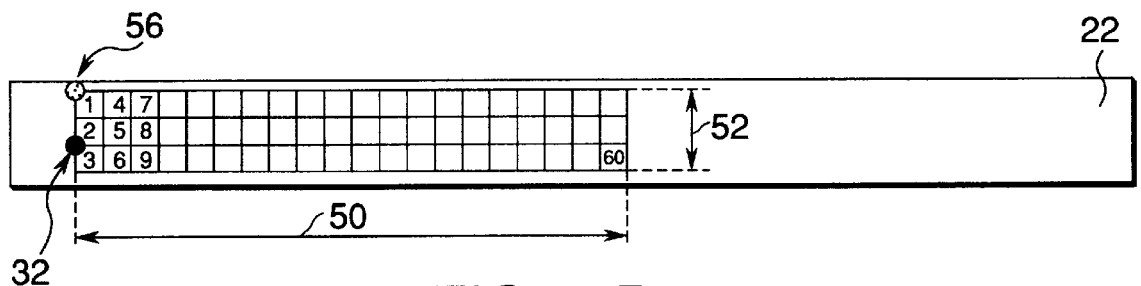

Alternatively, in FIG. 11B, the desired code position information 32 is converted to conversion code position information 56 and the position of the dot code 170 is displaced so that the dot code 170 is completed in one division image 22. Thus, the dot code 170 can be printed with no distortion, without varying the desired code length 50 or desired code width 52.

Figure 11C:
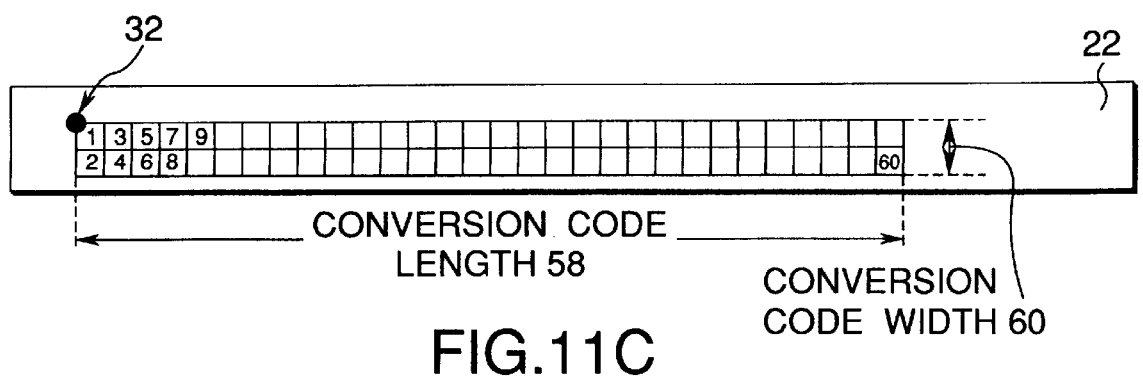

Alternatively, in FIG. 11C, the desired code length 50 is converted to conversion code length 58 and the desired code width 52 is converted to conversion code width 60. Thus, the dot code 170 can be recorded so that it is completed in one division image 22. In this case, the dot code 170 can be printed with no distortion, without varying the desired code position information 32.

One of the recording modes illustrated in FIGS. 11A to 11C may be selected automatically or according to the layout editor's wish.

Figure 15:
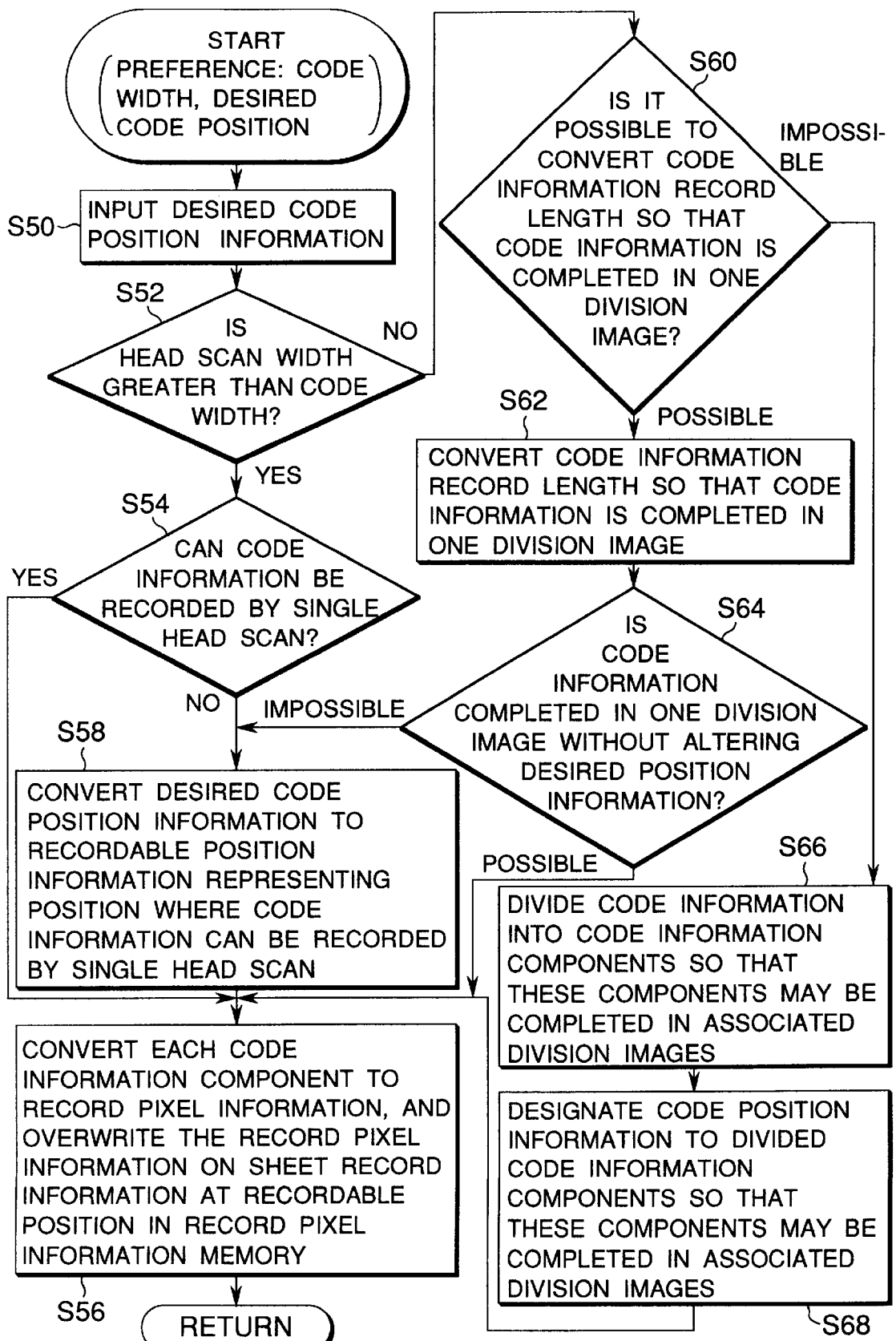
FIG. 15 is a flow chart illustrating the details of a process of converting media data, mentioned in the flow chart of FIG. 12, to code information, converting the code information to record pixel information, and overwriting the record pixel information on a predetermined position in the record pixel information memory, thereby effecting the recording shown in FIGS. 11A to 11C.

If the recording mode is selected automatically, the step in FIG. S20 for converting the media data to code information, converting the code information to record pixel information and overwriting the record pixel information in the record pixel information memory at a storage area associated with the predetermined position is modified as illustrated in the flow chart of FIG. 15.

The layout editor inputs, by means of the layout information input unit 48, the desired code position information 32 representing the desired position on the page where the dot code 170 is to be recorded (step S50). Accordingly, the CPU 10 converts the media data stored in the media data memory 16B to code information, as disclosed in EP 0,670,555 A1 filed by the assignee of the present invention. It is determined whether the head scan width 26 is greater than the desired code width 52 (step S52).

If the head scan width 26 is greater than the desired code width 52, it is determined whether the code information can be recorded by a single head scan operation (step S54). Even if the head scan width 26 is greater than the desired code width 52, the code information may not necessarily be recorded in one division image 22, depending on the desired code position information 32. Thus, it is determined whether the code information can be recorded by a single head scan operation.

If the code information can be recorded by a single head scan operation without varying the desired code position information 32, the code information is converted to record pixel information and overwritten in the record pixel information memory 16A at the recordable position (i.e. the desired code position information 32 in this case)(step S56). Thus, this process is finished and the control returns to the upper-level flow chart.

If it is determined in step S54 that the code information cannot be recorded by a single head scan operation, the desired code position information 32 is converted to position information representing the position where the code information can be recorded by a single head scan operation (i.e. conversion code position information 56) (step S58). Then, the control goes to step S56. Specifically, the code information is converted to record pixel information and overwritten in the record pixel information memory 16A at an are associated with the recordable position (i.e. conversion code position information 56). This process is thus finished and the control returns to the upper-level flow chart. Thereby, the recording as illustrated in FIG. 11B is performed.

If it is determined in step S52 that the head scan width 26 is not greater than the desired code width 52, it is determined whether the code record length can be converted so that the code information can be completed in one division image (step S60). The possibility of conversion of the record length is determined for the following reason. When a code width is reduced to record a code in one division image, the code length increases. There is a concern, however, that the code length would exceed the width of, e.g. an A4-sized sheet or that the code would overlap sheet record information laid out on the sheet. It is thus determined whether the code record length can be converted so that the code information is completed in one division image.

If the record length or code length can be varied, the record length of code information is converted so that the code information is completed in one division image (step S62).

Then, it is determined whether or not code information can be completed in one division image without altering desired code position information (step S64).

If the code information can be completed in step S64, the control goes to step S56 to convert the code information to record pixel information and overwrite the record pixel information in the record pixel information memory 16A at the recordable position (desired code position information 32). Thus, the present process is finished and the control returns to the upper-level flow chart. The recording operation as illustrated in FIG. 11C is performed in this manner.

On the other hand, if it is determined that code information cannot be completed in one division image in step S64, the control goes to step S58 to convert desired code position information 32 to recordable position information representing the position where code information can be recorded by a single head scan operation.

If it is determined in step S60 that the code information record length cannot be converted so that the code information is completed in one division image, the code information is divided into code information components so that these components may be completed in associated division images (step S66). Code position information is designated to the divided code information components so that these components may be completed in associated division images (step S68).

The control then advances to step S56 to convert each code information component to record pixel information and overwrite the record pixel information in the record pixel information memory 16A at the recordable position (desired code position information 32, code position information 54 of divided codes). This process is thus completed and the control returns to the upper-level flow chart. Thereby, the recording as illustrated in FIG. 11A is carried out.

A description will now be given of the case where the desired code position information 32 is not designated and the desired code width 52 alone is designated.

Figure 16A:
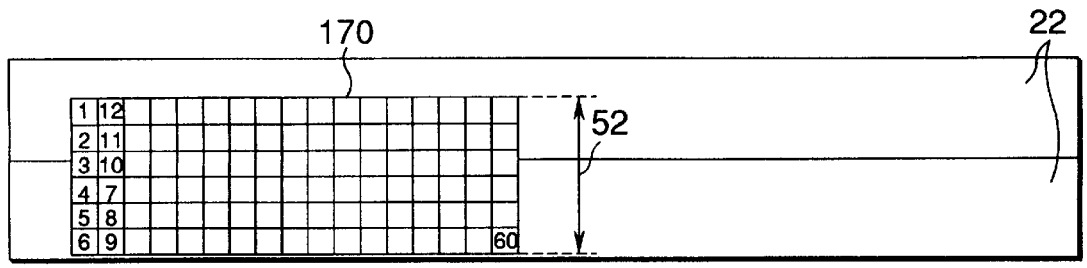
FIGS. 16A to 16D show relationships between division images and codes, for describing the operation of the first embodiment.
Figure 16B:
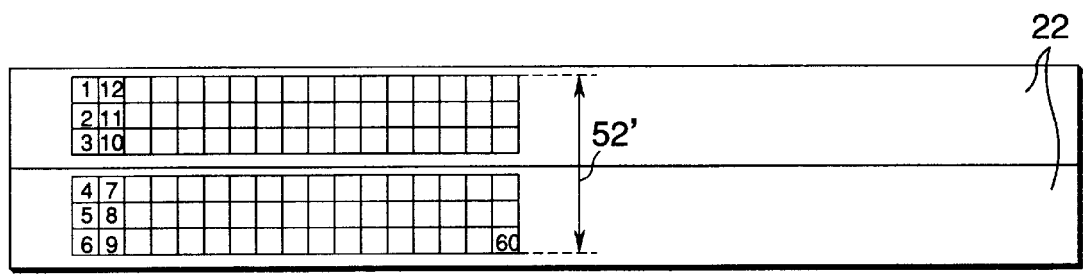

In the case of recording a dot code 170 over a plurality of division images 22 with a code width 52 desired by the layout editor, as shown in FIG. 16A, it is possible to divide the dot code 170 into two portions and record them, as shown in FIG. 16B. In this case, a desired code width 52' may be set to be substantially equal to the original desired code width 52. In this example, the record position and code width are set at optimal values so that the respective blocks 172 may be efficiently arranged on the associated division images.

Figure 16C:
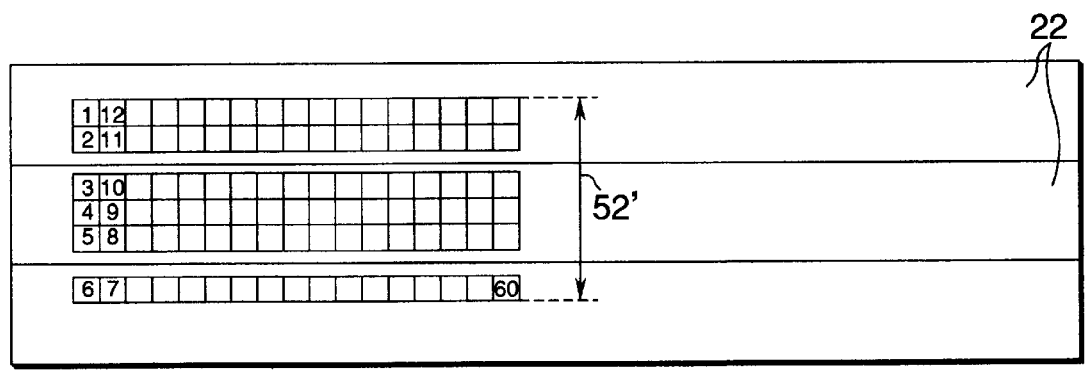

As is shown in FIG. 16C, the dot code 170 may be divided into three portions without substantially altering the position of the code 170. Specifically, the desired code width 52 is maintained without altering the original position.

Figure 16D:
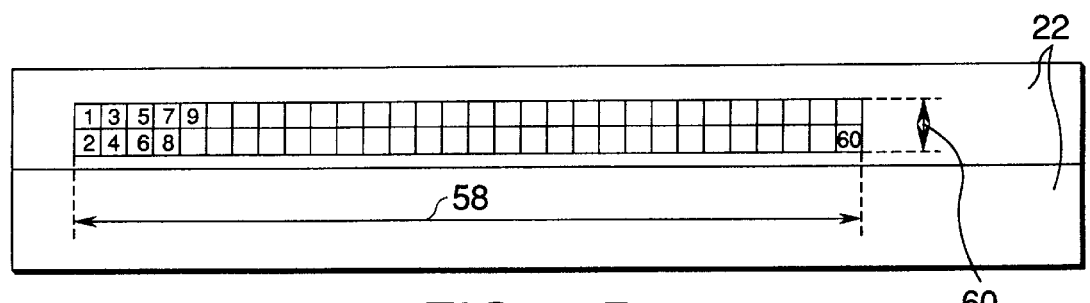

Alternatively, as shown in FIG. 16D, the dot code 170 can be completed and recorded in one division image 22 by altering the code length and code width. In FIG. 16D, the arrangement of code blocks is varied to alter the conversion code length. Thus, the dot code 170 is completed in one division image.

Figure 17:
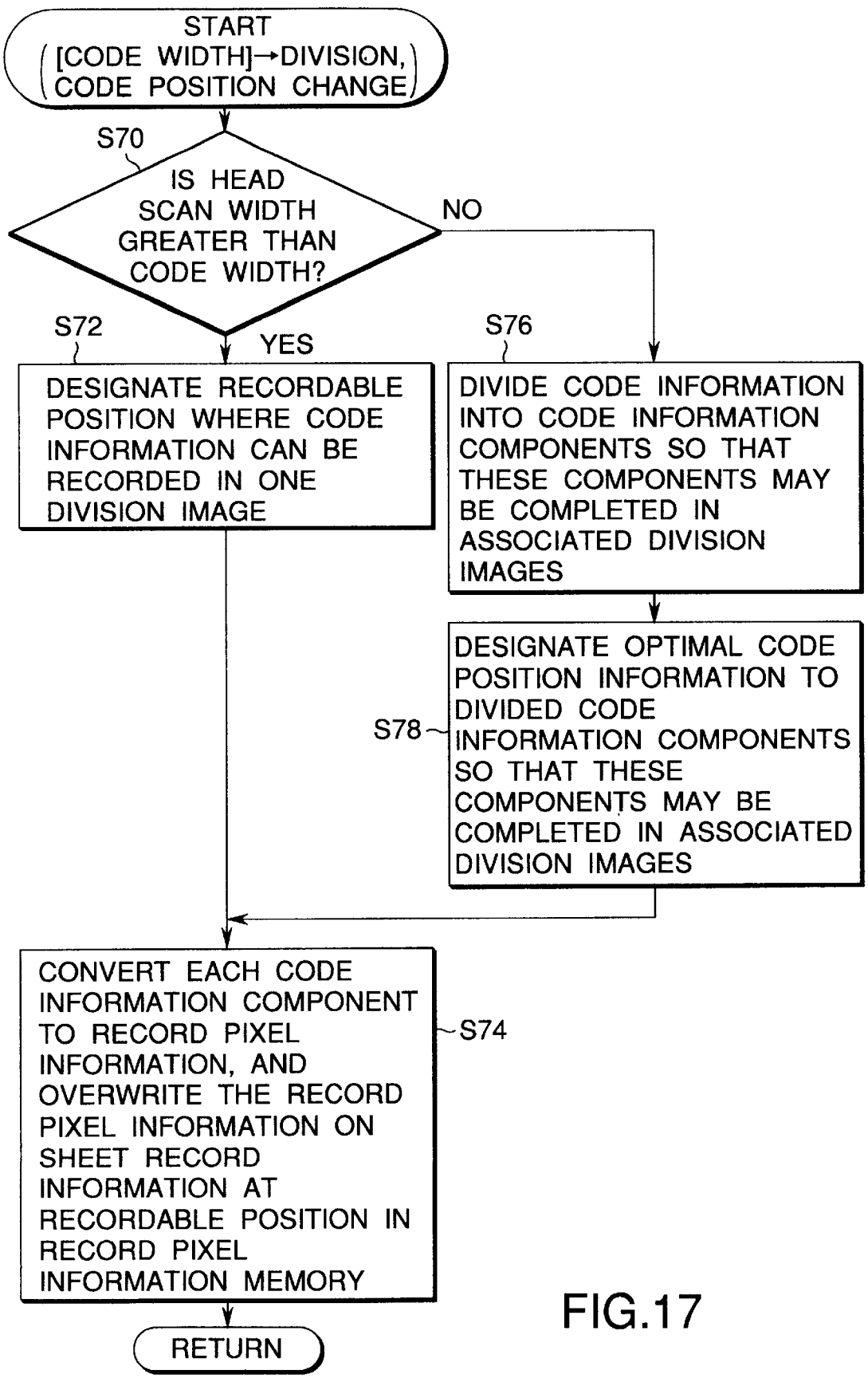
FIG. 17 is a flow chart illustrating the details of a process of converting media data, mentioned in the flow chart of FIG. 12, to code information, converting the code information to record pixel information, and overwriting the record pixel information on a predetermined position in the record pixel information memory, thereby effecting the recording shown in FIGS. 16B and 16C.

The recording modes illustrated in FIGS. 16B and 16C can be achieved if the operation of step S20 for converting the media data to code information, converting the code information to record pixel information and overwriting the record pixel information in the record pixel information memory at a storage area associated with the predetermined position is modified as illustrated in the flow chart of FIG. 17.

Specifically, if the layout editor inputs desired code position information 32 through the layout information input unit 48, the CPU 10 converts the media data stored in the media data memory 16B to code information, as disclosed in EP 0,670,555 A1. It is determined whether the head scan width 26 is greater than the desired code width 52 (step S70).

If the head scan width 26 is greater than the desired code width 52, the position of the code is set at a recordable position where the code information can be recorded in one division image (step S72). The converted code information is converted to record pixel information and overwritten on sheet record information at recordable position in the record pixel information memory 16A (step S74). The present process is thus completed and the control returns to the upper-level flow chart.

If it is determined in step S70 that the head scan width 26 is not greater than the desired code width 52, the code information is divided into code information components so that these components may be completed in associated division images (step S76). Code position information is designated to the divided code information components so that these components may be completed in the associated division images (step S78).

Subsequently, the control advances to step S74, and each code information is converted to record pixel information and overwritten on sheet record information at recordable position in the record pixel information memory 16A. The present process is thus completed and the control returns to the upper-level flow chart.

Figure 18:
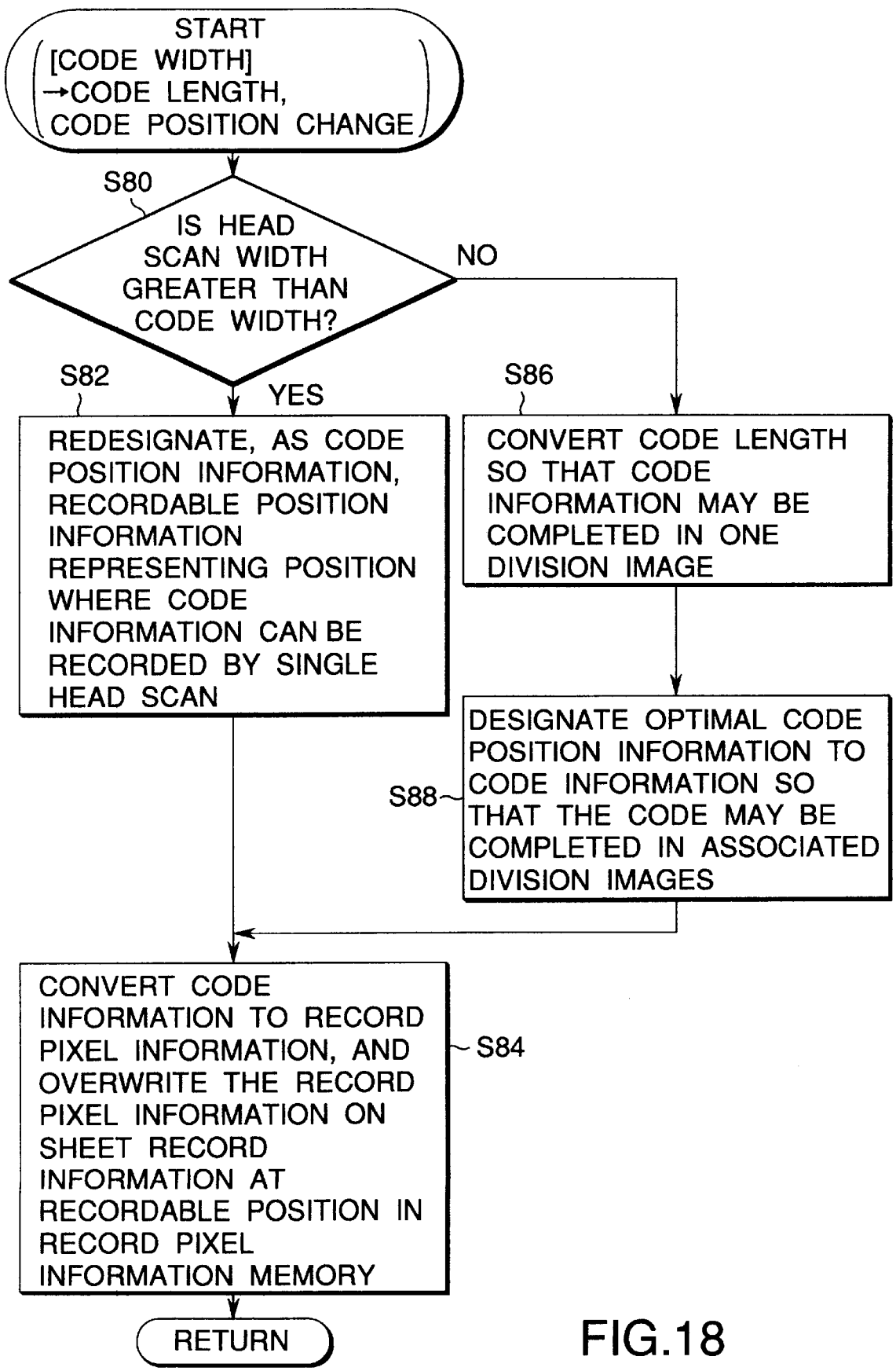
FIG. 18 is a flow chart illustrating the details of a process of converting media data, mentioned in the flow chart of FIG. 12, to code information, converting the code information to record pixel information, and overwriting the record pixel information on a predetermined position in the record pixel information memory, thereby effecting the recording shown in FIG. 16D.

The recording mode as illustrated in FIG. 16D can be achieved if the operation of step S20 for converting the media data to code information, converting the code information to record pixel information and overwriting the record pixel information in the record pixel information memory at a storage area associated with the predetermined position is modified as illustrated in the flow chart of FIG. 18.

Specifically, if the layout editor inputs desired code position information 32 through the layout information input unit 48, the CPU 10 converts the media data stored in the media data memory 16B to code information, as disclosed in EP 0,670,555 A1. It is determined whether the head scan width 26 is greater than the desired code width 52 (step S80).

If the head scan width 26 is greater than the desired code width 52, recordable position information representing a position where code information can be recorded by a single head scan operation is redesignated as code position information (step S82). The converted code information is converted to record pixel information and overwritten on sheet record information at a recordable position in the record pixel information memory 16A (step S84). The present process is thus completed and the control returns to the upper-level flow chart.

If it is determined in step S80 that the head scan width 26 is not greater than the desired code width 52, the code length is converted so that the code information is completed in one division image (step S86). Optimal code position information is designated to the code information so that the code information may be completed in one division image (step S88).

The control then advances to step S84, and the code information is converted to record pixel information and overwritten on sheet record information at a recordable position in the record pixel information memory 16A. The present process is thus completed and the control returns to the upper-level flow chart.

A description will now be given of the case where a dot code is recorded in accordance with sheet record information input through the sheet record information input unit 14.

Figure 19A:
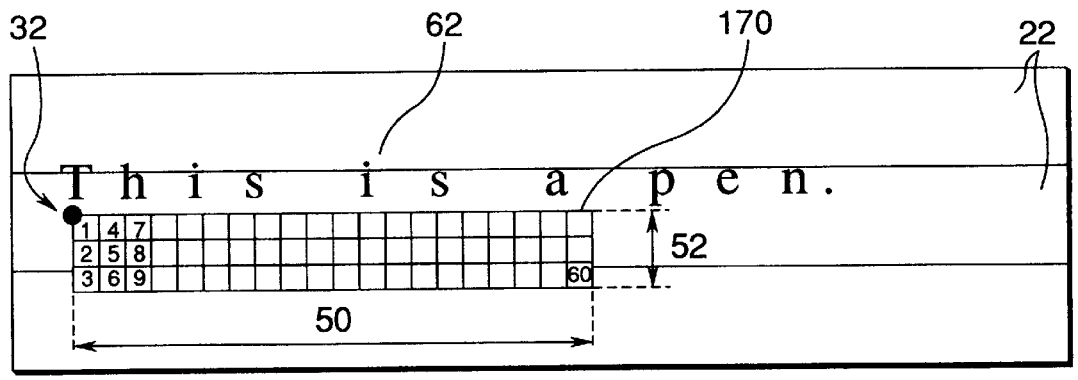
FIGS. 19A to 19C show relationships between division images and codes, for describing the operation of the first embodiment.

In an example shown in FIG. 19A, a dot code 170 is to be recorded below a character sequence "This is a pen." which is sheet record information 62. In this case, the layout editor inputs code recordable range information through the sheet record information input unit 14. Specifically, when the dot code 170 is to be recorded over plural division images 22 and the code record position, etc. are varied, as mentioned above, the layout editor designates the range for recording the dot code 170 so that the dot code 170 may not overlap the sheet record information 62.

Figure 19B:
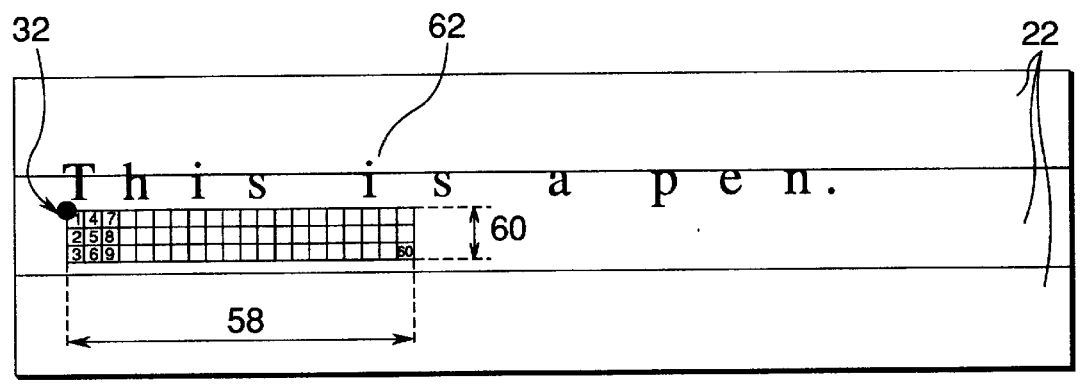

In this case, as is shown in FIG. 19B, the desired code width 52 and code length 50 are varied to a conversion code width 60 and a conversion code length 58 so that the code information is completed in one division image. That is, the size of the dot code is reduced so that the code is recorded in one division image and within the code recordable range.

Figure 20:
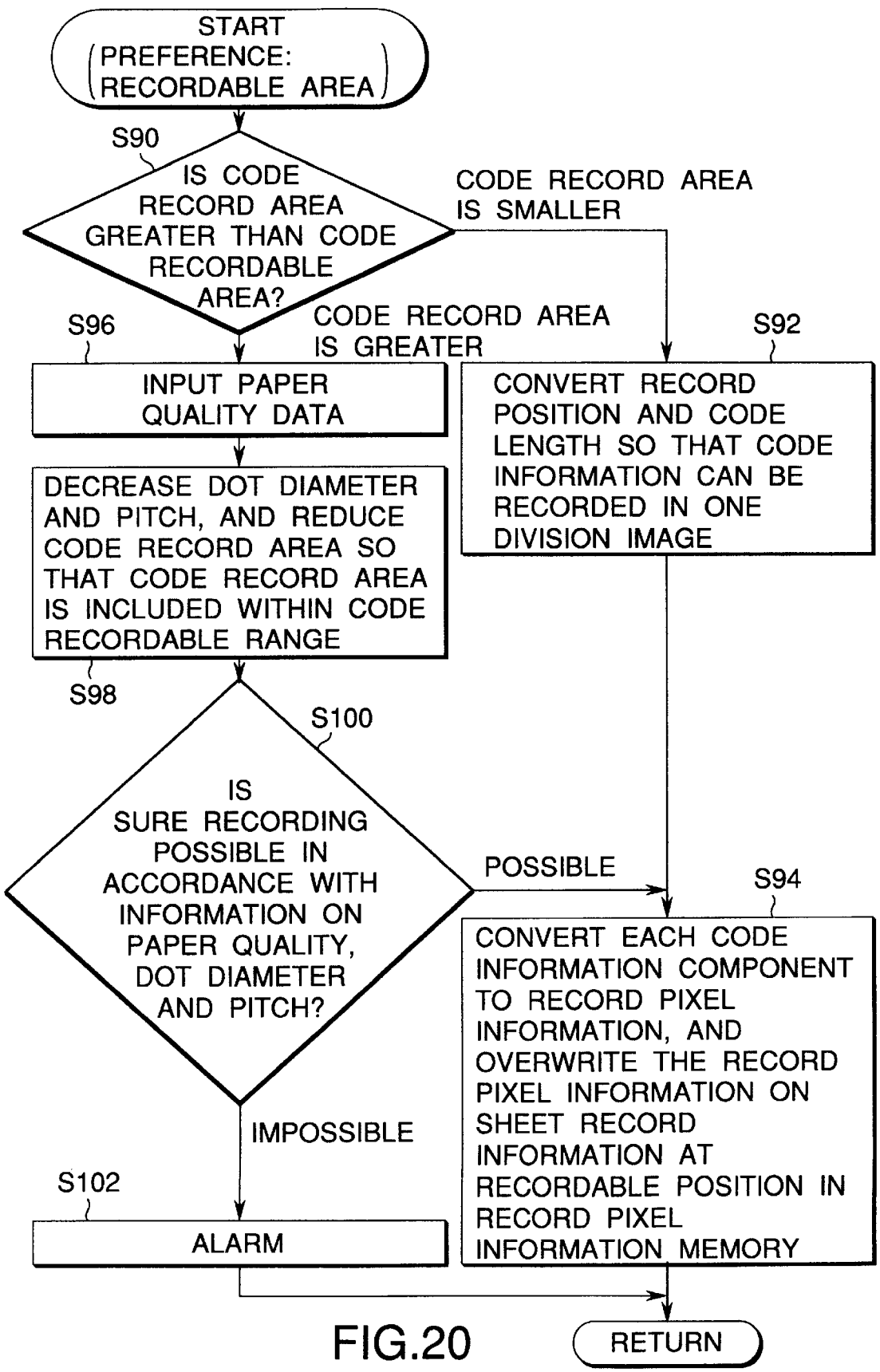
FIG. 20 is a flow chart illustrating the details of a process of converting media data, mentioned in the flow chart of FIG. 12, to code information, converting the code information to record pixel information, and overwriting the record pixel information on a predetermined position in the record pixel information memory, thereby effecting the recording shown in FIG. 19B.

This printing mode in which the size of the dot code is varied can be achieved if the operation of step S20 for converting the media data to code information, converting the code information to record pixel information and overwriting the record pixel information in the record pixel information memory at a storage area associated with the predetermined position is modified as illustrated in the flow chart of FIG. 20.

Specifically, if the layout editor inputs desired code position information 32 and desired code width 52 through the layout information input unit 48, the CPU 10 converts the media data stored in the media data memory 16B to code information, as disclosed in EP 0,670,555 A1. Then, it is determined whether the code record area (i.e. desired code width x code length) is greater than the code recordable area (step S90). In this context, the code recordable area refers to a code recordable range determined by code recordable range information input through the sheet record information input unit 14, and a range in which the code information can be recorded in one division image.

If it is determined that the code record area is smaller than the code recordable area, the record position and code length are converted so that the code information can be recorded in one division image (step S92). The code information is converted to record pixel information and overwritten on sheet record information at a recordable position in the record pixel information memory 16A (step S94). The present process is thus completed and the control returns to the upper-level flow chart.

On the other hand, if it is determined that the code record area is greater than the code recordable area, information on paper quality is input from the paper quality input unit 46 (step S96). The information on paper quality may be input in advance and stored in the RAM 16.

Figures 21, 22A, 22B, 22C:
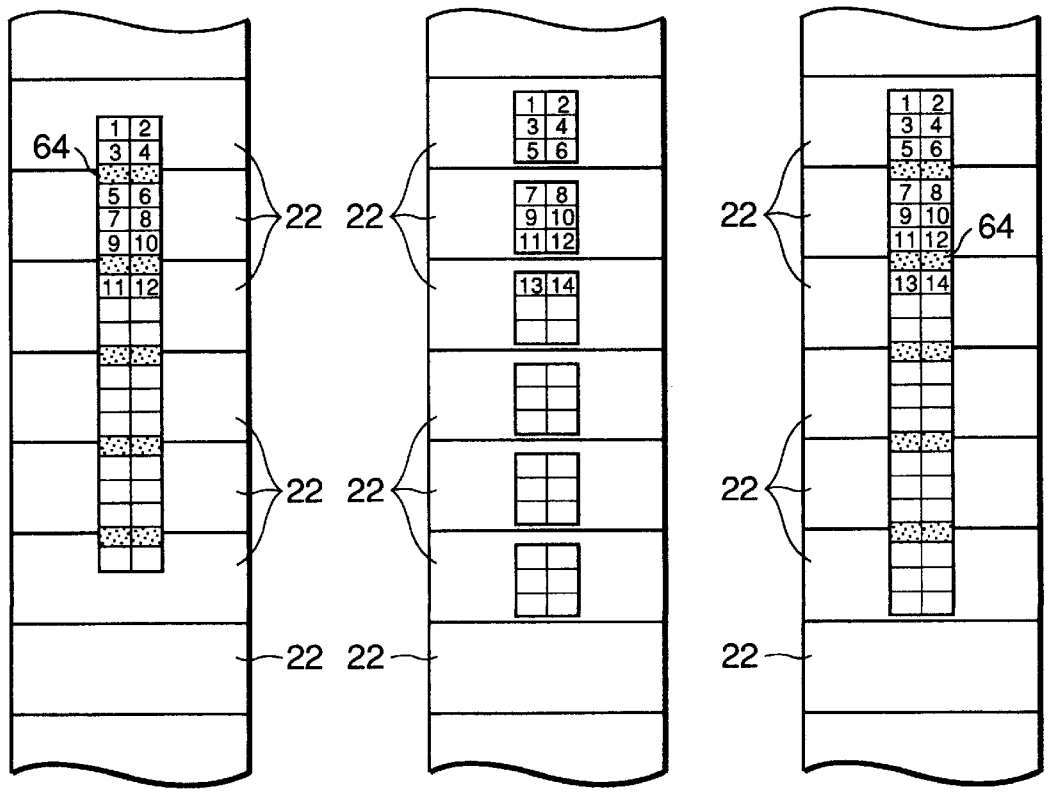
FIG. 21 shows a relationship between paper quality, on the one hand, and a dot pit and a dot diameter, on the other.
FIGS. 22A to 22C show relationships between division images and codes, for describing the operation of the first embodiment.

Then, the dot diameter and pitch are decreased and the code record area is reduced so that the code record area is included within the code recordable range (step S98). It is determined whether sure recording is possible in accordance with the information on paper quality, dot diameter and pitch (step S100). If the paper quality is low, it is difficult to record a code with a small dot diameter and a small pitch. The dot code 170 may not surely be recorded, depending on the relationship among the paper quality, dot diameter and recordable resolution of the printer engine 18. In other words, if a code with too small a dot diameter is recorded, the quality of the dot code would become too low and the dot code could not be read. Thus, it is determined here whether sure recording is possible. For example, a table indicating the relationship between the paper quality, dot pitch and dot diameter, as shown in FIG. 21, may be stored in the RAM 16. Referring to the table, it can be determined whether sure recording is possible.

If it is determined that the sure recording is possible, the control advances to step S94. The code information is converted to record pixel information and overwritten on sheet record information at a recordable position in the record pixel information memory 16A. The present process is thus completed and the control returns to the upper-level flow chart. In this manner, the recording as illustrate in FIG. 19B is carried out.

If it is determined in step S100 that the sure recording is not possible, and an alarm is produced to indicate that the code cannot be recorded on the paper sheet (step S102). Then, the present process is finished and the control returns to the upper-level flow chart.

Figure 19C:
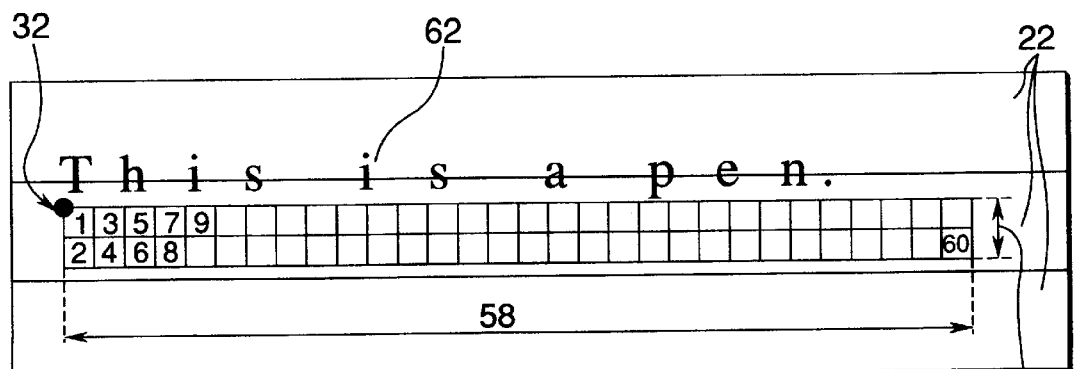

If it is determined that the sure recording is impossible, the code may be enlarged inversely, as shown in FIG. 19C, so that the code information is - completed in one division image. Specifically, if the paper quality is low, the dot diameter or pitch may be increased to enlarge the code. At the same, in order to solve a problem of distortion between division images in this example, the code length is converted so that the code information may be recorded in one division image.

Needless to say, the problem of distortion between division images may be solved by enlarging the code and dividing the code, aside from the method of enlarging the code and altering the conversion code length.

Figure 6:
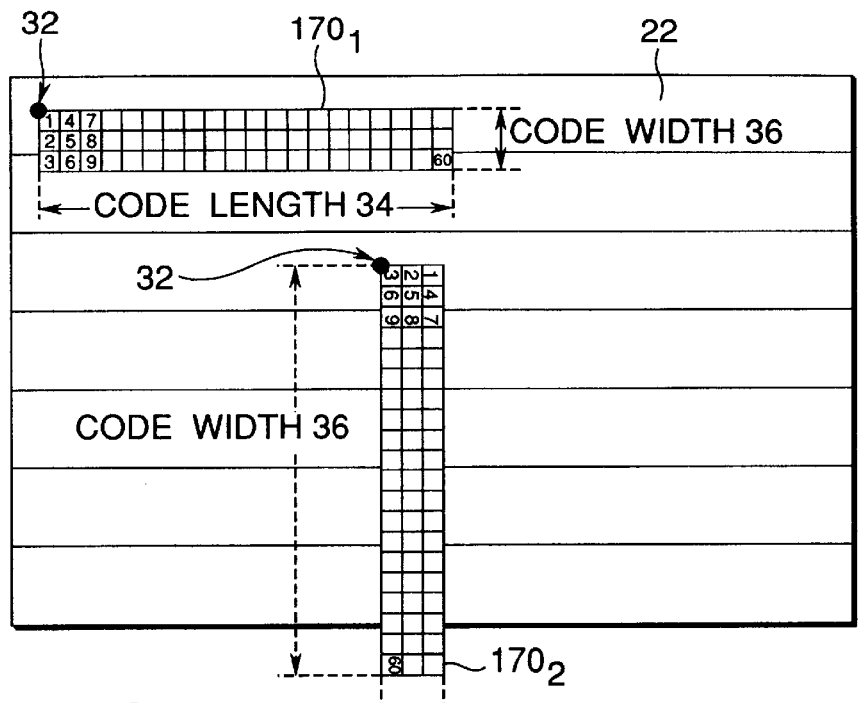
FIG. 6 shows dot codes recorded over a plurality of division images.
Figure 7:
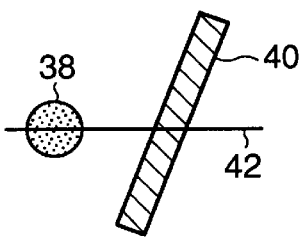
FIG. 7 shows an ideal record state of a one-page image including a dot code, when the one-page image is printed by performing two or more printing operations of division images by means of a printer apparatus.
Figure 8A:
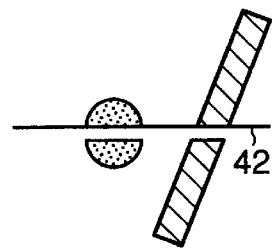
FIGS. 8A to 8C show examples of defective recorded images, for explaining problems arising when the image in FIG. 7 is printed by the conventional printer apparatus.
Figure 8B:
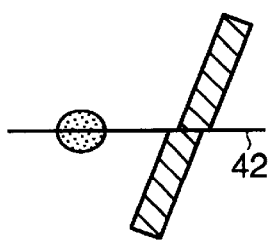
Figure 8C:
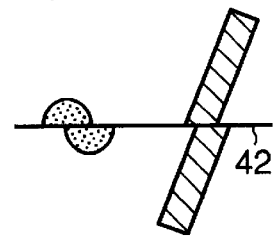

A description will now be given of a case of recording a dot code having a longitudinal direction coinciding with the direction of transfer of paper sheet 20, like the dot code "2" 170₂ shown in FIG. 6.

In this case, too, the aforementioned problem arises since the code extends over division images.

A block 172 spanning division images 22 is recorded as dummy block 64, as shown in FIG. 22A. Specifically, the dot code 170 is divided into components and addresses 172 are assigned to the respective blocks 172. No block address is added to the dummy block 64, or a dummy block address is added thereto. The block addresses 176 are added to blocks except the dummy blocks 64. The dummy block 64 has the same size as the block 172. When the code is read, the multimedia information is decoded with the dummy blocks 64 excluded. The unity of the code is created by recording such dummy blocks 64.

As is shown in FIG. 22B, divided code components may be efficiently divided and completed in associated division images 22. In this case, too, as shown in FIG. 22C, it is preferable to add dummy blocks 64 so that the user may visually recognize that the divided code components constitute one code. In this case, however, the dummy block 64 may not necessary have the same size as the block 172.

Figure 23:
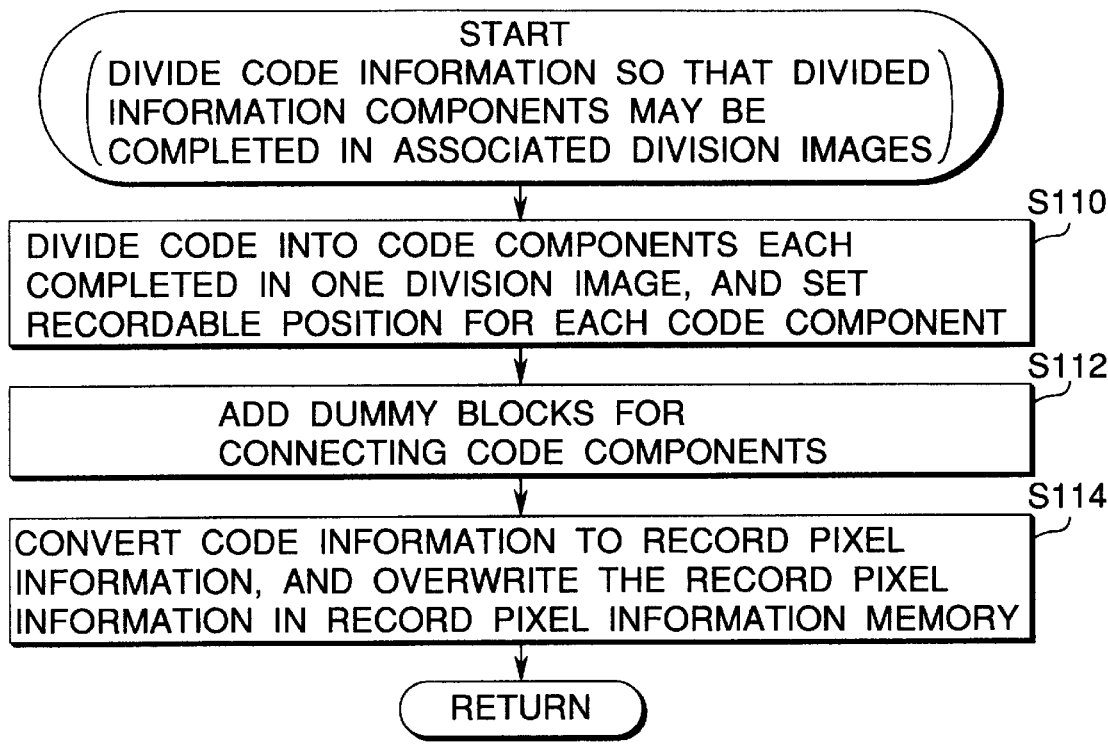
FIG. 23 is a flow chart illustrating the details of a process of converting media data, mentioned in the flow chart of FIG. 12, to code information, converting the code information to record pixel information, and overwriting the record pixel information on a predetermined position in the record pixel information memory, thereby effecting the recording shown in FIGS. 22A and 22C.

FIG. 23 is a flow chart illustrating in detail the process of dividing the code information, for example, in steps S46, S66 and S76, so that the divided components may be completed in associated division images, thereby to achieve the recording modes illustrated in FIGS. 22A and 22C.

Specifically, code information is divided into code components each completed in one division image, and a recordable position is set for each code component (step S110). Dummy blocks 64 are added to connect the divided code components (step S112). The divided code information components are converted to record pixel information and overwritten in the record pixel information memory 16A (step S114). Thus, the present process is finished and the control returns to the upper-level flow chart.

Figure 24A:
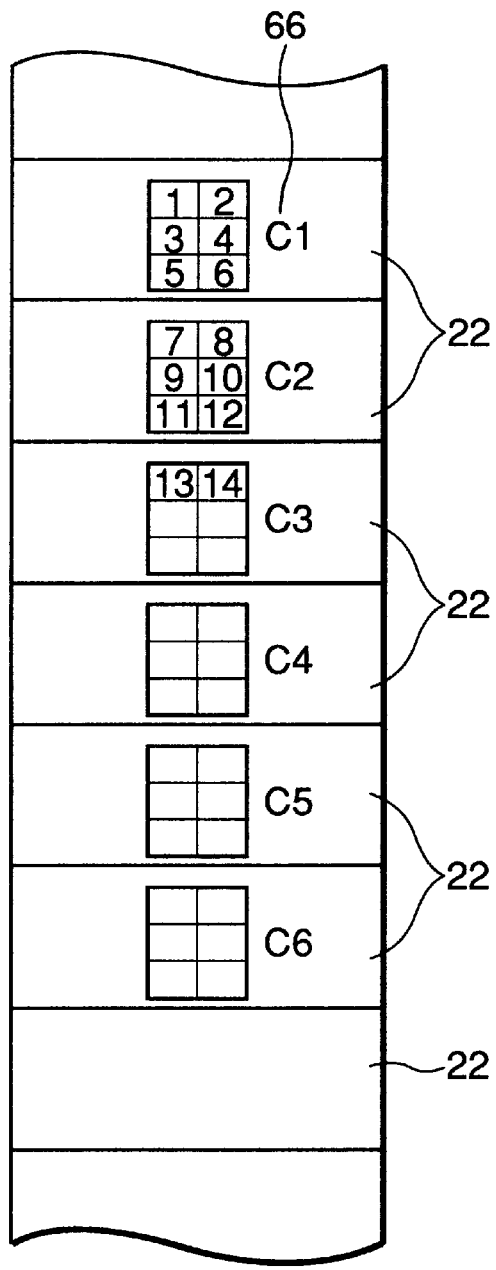
FIGS. 24A and 24B show relationships between division images and codes, for describing the operation of the first embodiment.
Figure 24B:
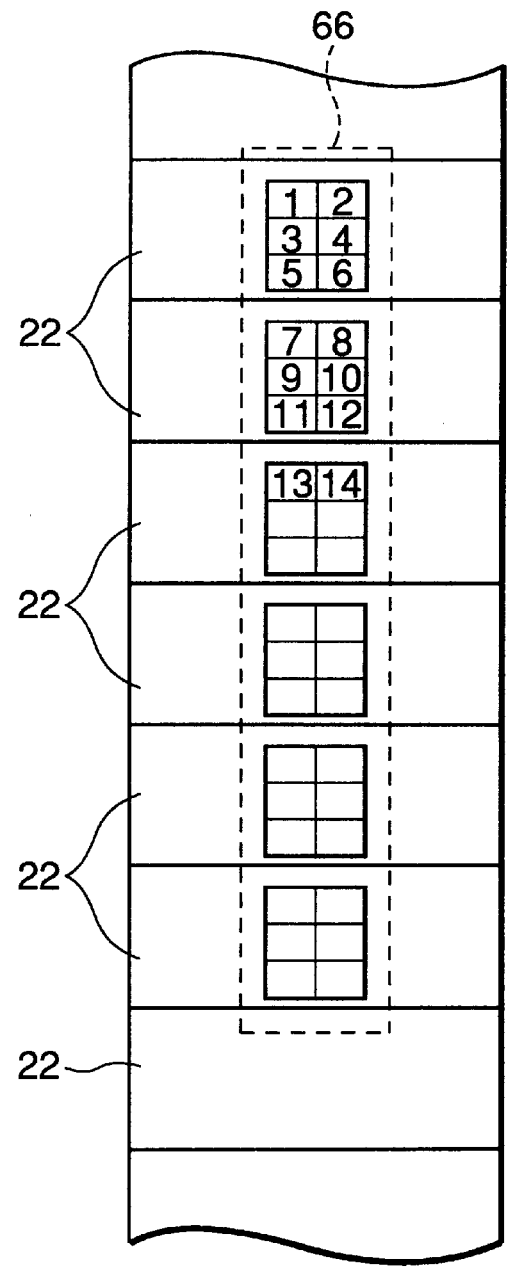

Instead of providing the dummy block 64, identification information 66 indicating that the divided code components constitute sequential multimedia information may be recorded, as shown in FIGS. 24A and 24B. The identification information 66 as illustrated in FIG. 24A identifies the divided code components as being the sequential multimedia information, as well as indicating the order of scan of codes.

Figure 25:
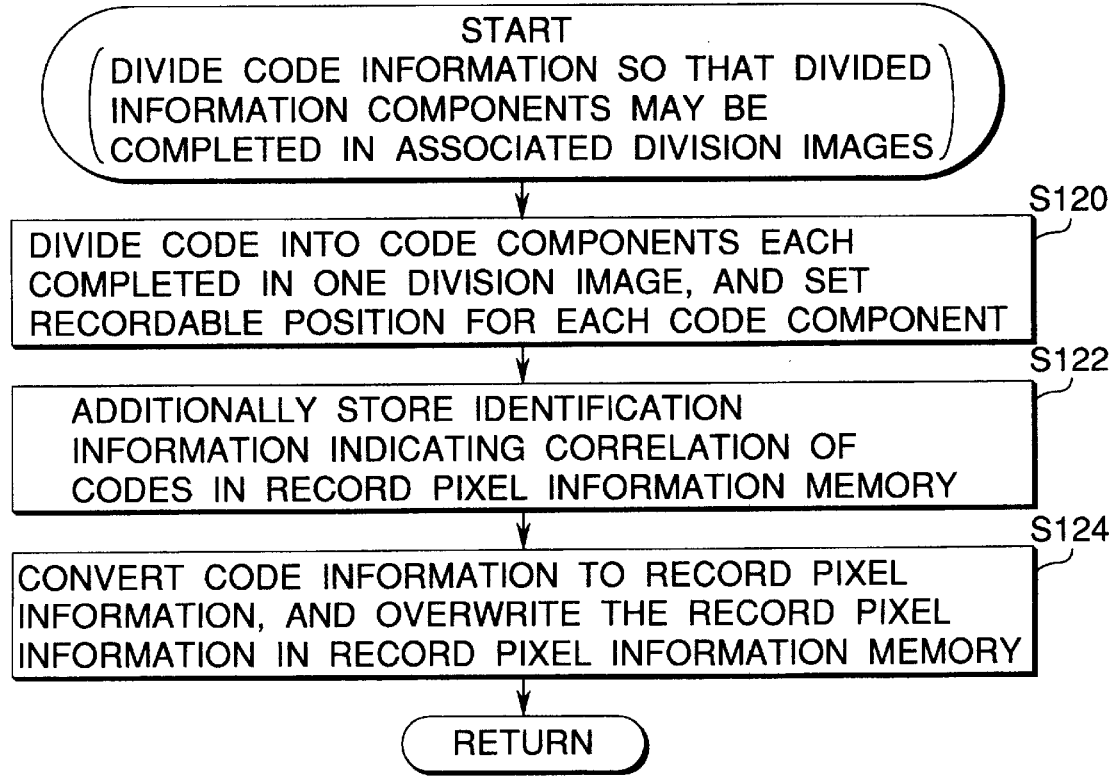
FIG. 25 is a flow chart illustrating the details of a process of converting media data, mentioned in the flow chart of FIG. 12, to code information, converting the code information to record pixel information, and overwriting the record pixel information on a predetermined position in the record pixel information memory, thereby effecting the recording shown in FIGS. 24A and 24B.

The recording of the identification information 66 is carried out by a subroutine of steps S46, S66 and S76, as illustrated in FIG. 25.

At first, the code information is divided into code components each completed in one division image, and a recordable position is set for each code component (step S120). Identification information 66 indicating the correlation of the code components is additionally stored in the record pixel information memory 16A (step S122). The divided code information component is converted to record pixel information and overwritten in the record pixel information memory 16A (step S124). Thus, the present process is finished and the control returns to the upper-level flow chart.

A second embodiment of the present invention will now be described. In the first embodiment, the code is recorded by one-way scan of the recording head 18A. By contrast, in the second embodiment, the code is recorded by a plurality of scan operations of the recording head 18A.

In the second embodiment, a multi-record division image memory 16C is added to the RAM 16 in addition of the structure of the first embodiment as shown in FIG. 9. The multi-record division image memory 16C stores record image information for second and following recording operations, when a code is to be recorded by a plurality of scanning operations of the recording head 18A. This memory 16C has a capacity for one division image.

The operation of the structure of the second embodiment will now be described.

For example, when a marker 174 of the dot code 170 is recorded by the conventional information recording apparatus, an incomplete blurring record pixel 68 may be recorded, as shown in FIG. 26A. If there is such a blurring record pixel 68, the dot code may not exactly be read. In the case of a reading apparatus which discriminates the marker 174 on the basis of the presence of a predetermined number of successive black pixels, the marker 174 may not be discriminated due to the blurring pixel 68 since the condition for the predetermined number of successive pixels fails to be met.

In the present embodiment, the marker 174 is recorded by a plurality of head scan operations. Thus, the marker 174 can be exactly recorded with no white portion therein, as shown in FIG. 26B. In other words, the blurring record pixel 68 becomes the complete pixel as a result of the repeated recording, and white portions among the record pixels can exactly be eliminated by virtue of mechanical displacement during plural scan operations.

The same applies to the recording of dots. FIG. 27A shows the state in which an information dot 70 within the data area 180, which comprises nine record pixels 72, is recorded by a single one-way scan of the recording head 18A of the conventional information recording apparatus. In this case, a blurring record pixel 68 may be recorded. However, the information dot 70 can exactly be recorded by recording all record pixels 72 by a plurality of head scan operations.

There is a concern, however, that the size of the information dot 70 would increase and distinction between adjacent dots 70 would become difficult if all record pixels 72 are recorded by plural head scan operations. To solve this problem, the following method should preferably be adopted. In consideration of the mechanism of reading the dot code 170, it should suffice if only a central portion of the information dot 70 is exactly recorded. Accordingly, if a central record pixel 74 alone is recorded by plural head scan operations, the central portion of the information dot 70 can be exactly recorded with no increase in size of the information dot 70, as shown in FIG. 27B.

Figure 28:
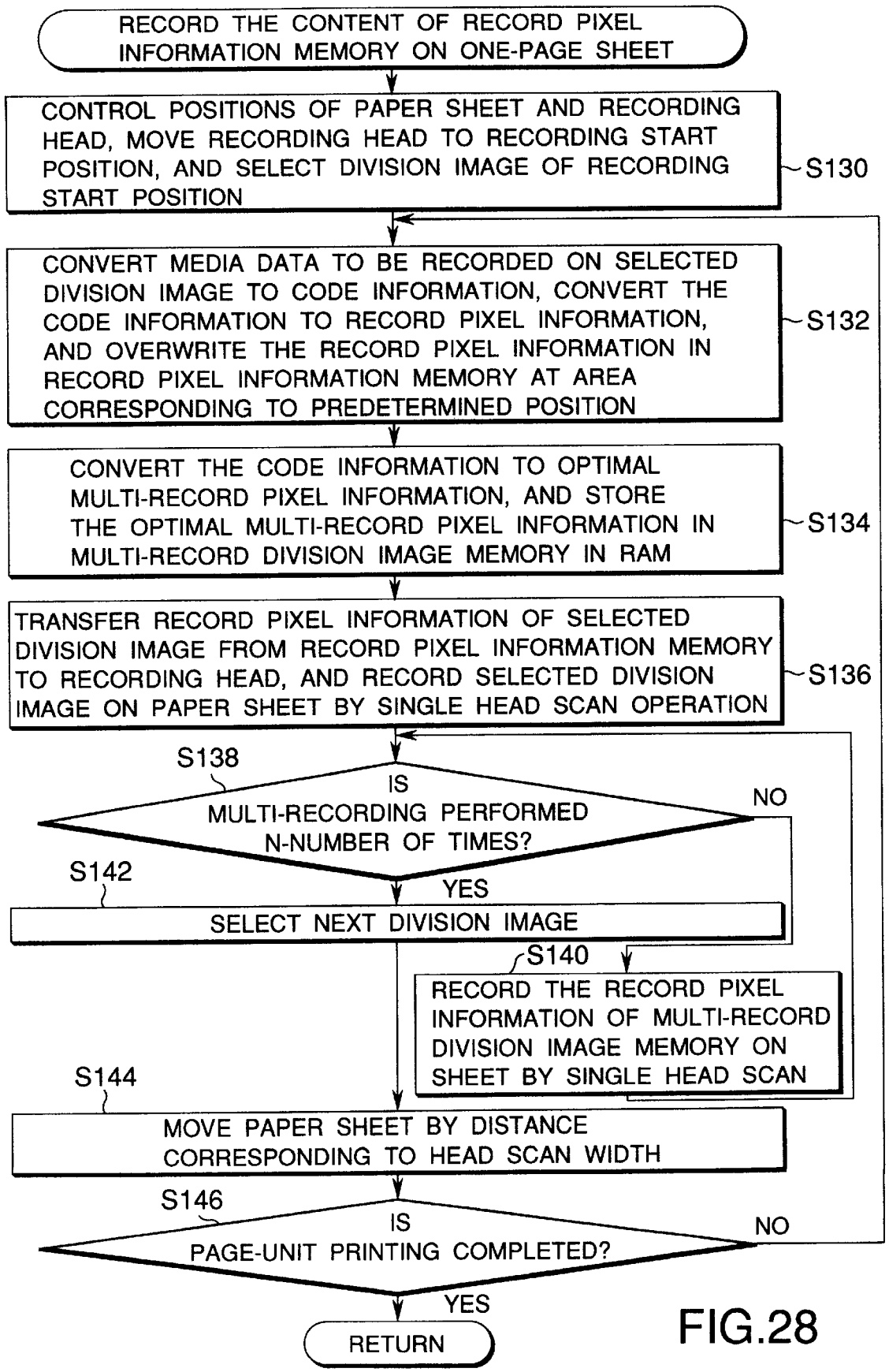
FIG. 28 is a flow chart of a process corresponding to a process of recording the content of a record pixel information memory, mentioned in the flow chart of FIG. 12, on a one-page sheet, thereby to describe the operation of the second embodiment.

FIG. 28 is a flow chart illustrating the above process. This process is achieved by modifying steps S20 and S22 in FIG. 12, as shown in FIG. 15.

The positions of the paper sheet 20 and recording head 18A are controlled, the recording head 18A is moved to the recording start position, and the division image of the recording start position is selected (step S130). The media data to be recorded on the selected division image is converted to code information, the code information is converted to record pixel information, and the record pixel information is overwritten in the record pixel information memory 16A at an area corresponding to the predetermined position (step S132). The code information is converted to optimal multi-record pixel information and then stored in the multi-record division image memory 16C in the RAM 16 (step S134). In this context, the optimal multi-record pixel information is image information having only the central record pixel 74 of nine record pixels 72 constituting the information dot 70. Needless to say, when the information dot 70 comprises more record pixels, the optimal multi-record pixel information may have two or more record pixels including the central one, and not the central record pixel alone.

The record pixel information of the selected division image is transferred to the recording head 18A, and the selected division image is recorded on the paper sheet by a single head scan operation (step S136). It is determined whether the multi-recording operation has been performed an N-number of times (step S138). If the multi-recording operation has not been performed N-number of times, the record pixel information of the multi-record division image memory 16C is recorded on the sheet by a single head scan operation (step S140) and the control returns to step S138. Thus, the optimal multi-record pixel information is recorded on the same division image an N-number of times.

After the optimal multi-record pixel information has been recorded N-number of times, the next division image is selected (step S142) and the sheet 20 is moved by a distance corresponding to the head scan width 26 (step S144). It is then determined whether the page-unit printing has been completed (step S146). If not, the control returns to step S132 to record the next division image.

If it is determined in step S146 that the page-unit printing has been completed, the present process is finished and the control returns to the upper-level flow chart.

As has been described above, all or part of the record pixels are recorded by plural head scan operations so that the marker 174 or information dot 70 can be exactly recorded. In particular, if a portion closer to the center of the information dot 70 is recorded more than two times, the portion closer to the center of the information dot 70 can be recorded more exactly.

FIG. 27C illustrates another recording method. As regards the mechanical operation of the controller 18B, there is a tendency that the information dot 70 is not exactly recorded at the same point due to a mechanical error when it is printed several times. In this method, this tendency is utilized. The number of record pixels to be used to record the information dot 70 is reduced, and the reduced number of pixels are recorded by plural head scan operations. The record pixels, the number of which is reduced so that the size of the information dot 70 to be obtained would become smaller than its original one, are recorded by plural head scan operations. As a result, the position of recorded dot varies and the size of the resultant dot increases. Accordingly, the dot 70 is exactly recorded. In FIG. 27C, reference numeral $27_1$ denotes a record pixel recorded by a first one-way scan, numeral $27_2$ a record pixel recorded by a second one-way scan, numeral $27_3$ a record pixel recorded by a third one-way scan, and numeral $27_4$ a record pixel recorded by a fourth one-way scan.

The embodiments of the present invention have been described. The present invention, however, is not limited to these embodiments. Various modifications and applications may be made without departing from the spirit of the invention. The subject matter of the invention will now be summarized.

(1) An information recording apparatus for recording, on an information recording medium, multimedia information including at least one of audio information, image information and digital code data in the form of an optically readable code, the apparatus comprising:

a recording head unit for printing a code associated with the multimedia information on the information recording medium;

driving means for moving the recording head unit in a first direction of the information recording medium, while moving the information recording medium and the recording head unit relative to each other in a second direction perpendicular to the first direction; and control means for controlling the driving means, wherein said control means controls the driving means such that the code, which is spatially independent, is recorded on the information recording medium only by a single one-way scan operation of the recording head unit in the first direction, without moving the information recording medium and the recording head unit relative to each other in the second direction.

Specifically, the code can be exactly recorded with no distortion.

(2) The apparatus according to above item (1), wherein an effective printing width of the recording head unit in the second direction is greater than a code width in the second direction of the code associated with the multimedia information to be recorded.

Specifically, the code can be exactly recorded with no distortion.

(3) The apparatus according to above item (1) or (2), further comprising input means for inputting information relating to a position of the code on the information recording medium where the code is to be recorded, and information relating to a code width of the code in the second direction, wherein the control means executes a predetermined process in accordance with the information relating to the position of the code and the information relating to the code width, which is input from the input means, so that the code is recorded only by a single one-way scan operation of the recording head unit in the first direction, without moving the information recording medium in the second direction.

Specifically, the code can be exactly recorded with no distortion, in accordance with the input information on the code position and code width.

(4) The apparatus according to above item (3), wherein the control means divides the code into predetermined code components in accordance with the information relating to the position of the code and the information relating to the code width, which is input from the input means, so that the code is recorded only by a single one-way scan operation of the recording head unit in the first direction, without moving the information recording medium in the second direction.

Specifically, the code can be exactly recorded at a desired position with no distortion.

In addition, the code can be exactly recorded with no distortion, without varying the desired code width.

(5) The apparatus according to above item (3), wherein the control means alters the record position of the code on the information recording medium in accordance with the information relating to the position of the code and the information relating to the code width, which is input from the input means, so that the code is recorded only by a single one-way scan operation of the recording head unit in the first direction, without moving the information recording medium in the second direction.

Specifically, the code can be exactly recorded with no distortion, without varying the desired code width.

In addition, the code can be exactly recorded with no distortion, without dividing the code.

(6) The apparatus according to claim (3), wherein the control means varies a record length of the code in the first direction in accordance with the information relating to the position of the code and the information relating to the code width, which is input from the input means, so that the code is recorded only by a single one-way scan operation of the recording head unit in the first direction, without moving the information recording medium in the second direction.

Specifically, the code can be exactly recorded with no distortion, without dividing the code.

In addition, the code can be exactly recorded at a desired position with no distortion.

(7) The apparatus according to above item (1) or (2), further comprising input means for inputting information relating to a code width of the code on the information recording medium in the second direction, wherein the control means executes a predetermined process in accordance with the information relating to the code width, which is input from the input means, so that the code is recorded only by a single one-way scan operation of the recording head unit in the first direction, without moving the information recording medium in the second direction.

Specifically, the code can be exactly recorded with no distortion, without varying the desired code width.

(8) The apparatus according to above item (7), wherein the control means divides the code into predetermined code components in accordance with the information relating to the code width, which is input from the input means, so that the code is recorded only by a single one-way scan operation of the recording head unit in the first direction, without moving the information recording medium in the second direction.

Specifically, the code can be exactly recorded with no distortion, without substantially varying the desired code width.

(9) The apparatus according to above item (7), wherein the control means alters the record position of the code on the information recording medium in accordance with the information relating to the code width, which is input from the input means, so that the code is recorded only by a single one-way scan operation of the recording head unit in the first direction, without moving the information recording medium in the second direction.

Specifically, the code can be exactly recorded with no distortion, without varying the desired code width.

(10) The apparatus according to above item (7), wherein the control means varies a record length of the code in the first direction in accordance with the information relating to the code width, which is input from the input means, so that the code is recorded only by a single one-way scan operation of the recording head unit in the first direction, without moving the information recording medium in the second direction.

Specifically, the code can be exactly recorded with no distortion, without dividing the code.

In addition, the code can be exactly recorded with no distortion, without altering the code position.

(11) The apparatus according to above item (1) or (2), further comprising setting means for setting information relating to a cord recordable area on the information recording medium, wherein the control means alters the size of the code to be recorded, in accordance with the information relating to the code recordable area set by the setting means, so that the code is recorded only by a single one-way scan operation of the recording head unit in the first direction, without moving the information recording medium in the second direction.

Specifically, the code can be exactly recorded with no distortion, without dividing the code.

In addition, the code can be exactly recorded at a desired position with no distortion.

(12) The apparatus according to above item (11), wherein the control means alters the size of the code in accordance with the kind of the information recording medium used in the information recording apparatus.

Specifically, the code can be exactly recorded with no degradation in dot recording quality.

(13) The apparatus according to above item (12), wherein the control means includes alarm means for indicating the possibility/impossibility of recording of the code, on the basis of the altered size of the code and the kind of the information recording medium used in the information recording apparatus.

Specifically, the recorded code can be exactly reproduced, and the user is informed of the impossibility of exact recording.

(14) The apparatus according to above item (4) or (8), further comprising means for recording identification information indicating that each of the divided code components is one of the divided code components constituting the code.

Specifically, the user of the reproducing apparatus is informed that the recorded divided code components constitute total multimedia information.

(15) The apparatus according to above item (14), wherein said identification information includes at least a number indicating the order of reading of the divided code components.

Specifically, the user of the reproducing apparatus is informed that the recorded divided code components constitute total multimedia information, and also informed of the order of reading.

(16) The apparatus according to above item (14), wherein said identification information is a frame-shaped image recorded so as to contain all divided code components constituting the code.

Specifically, the user of the reproducing apparatus is informed that the recorded divided code components constitute total multimedia information.

(17) The apparatus according to above item (4) or (8), wherein said control means divides the code in the second direction.

Specifically, the code can be exactly recorded with no distortion, without substantially varying the desired code width.

(18) The apparatus according to above item (17), wherein said control means includes means for performing a control operation to record a visual quasi-code between the divided code components when the code is divided in the second direction.

Specifically, the recorded code can be exactly reproduced by a single scan operation, without making the user of the reproducing apparatus think of the division of the code.

In addition, the code with no distortion can be exactly recorded at the desired code position.

Moreover, the code with no distortion can be exactly recorded with an efficient recording density.

(19) The apparatus according to any one of above items (1) to (18), wherein the optically readable code comprises a set of two-dimensionally arranged, separable blocks, and each of the blocks includes at least a data dot pattern formed of dots arranged in accordance with the content of the multimedia information, and an address dot pattern indicating an address of the block arranged in a predetermined relationship in relation to the data dot pattern.

Specifically, flexible operations can be achieved. For example, the code length can be freely varied, the code can be divided, and the code size can be changed. The code which can be surely reproduced is recorded with no distortion.

(20) The apparatus according to any one of above items (1) to (18), wherein said recording head unit is a line-type head having a longitudinal direction coinciding with the second direction.

Specifically, when the recording head unit records the code only by a single one-way scan operation in the first direction, the code can be exactly recorded with no distortion.

(21) An information recording apparatus for recording, on an information recording medium, multimedia information including at least one of audio information, image information and digital code data in the form of an optically readable code, the apparatus comprising:

a recording head unit for printing a code associated with the multimedia information on the information recording medium;

driving means for moving the recording head unit in a first direction of the information recording medium, while moving the information recording medium and the recording head unit relative to each other in a second direction perpendicular to the first direction; and control means for controlling the driving means, wherein said control means controls the driving means such that when the code, which is spatially independent, is recorded on the information recording medium, the same code is overprinted by a plurality of scan operations of the recording head unit in the first direction, without moving the information recording medium and the recording head unit relative to each other in the second direction.

Specifically, a blurring record pixel, which is recorded by a single scan operation, is eliminated, and the code can be exactly recorded by overprinting.

(22) The apparatus according to above item (21), wherein the optically readable code comprises a set of two-dimensionally arranged, separable blocks, each of the blocks includes at least a data dot pattern formed of dots arranged in accordance with the content of the multimedia information, and an address dot pattern indicating an address of the block arranged in a predetermined relationship in relation to the data dot pattern, and the control means controls the driving means such that a central portion of each dot of the recorded code has a highest degree of overprinting.

Specifically, a degradation in quality of the code due to the blurring record pixel can be prevented, and the code can be exactly recorded without increasing the dot diameter.

(23) An information recording method for recording, on an information recording medium, multimedia information including at least one of audio information, image information and digital code data in the form of an optically readable code, the method comprising the steps of:

performing, when the code, which is spatially independent, is recorded on the information recording medium, a single one-way scan operation by moving a recording head unit for printing the code on the information recording medium in a predetermined direction; and controlling the recording of the code by the recording head unit such that the spatially independent code is recorded on the information recording medium only by said one-way scan operation.

Specifically, the code with no distortion can be exactly recorded. In addition, the code can be recorded with a minimum necessary driving amount, i.e. at high speed.

(24) An information recording method for recording, on an information recording medium, multimedia information including at least one of audio information, image information and digital code data in the form of an optically readable code, the method comprising the steps of:

performing, when the code, which is spatially independent, is recorded on the information recording medium, a plurality of one-way scan operations by moving twice or more a recording head unit for printing the code on the information recording medium in a predetermined direction; and controlling the recording of the code by the recording head unit such that the same code is overprinted by said plurality of one-way scan operations.

Specifically, the blurring record pixel, which is recorded when the code is recorded by a single one-way scan operation of the recording head for printing the code on the information recording medium in a predetermined direction, can be eliminated by overprinting, and the code can be recorded exactly.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An information recording apparatus for recording, on an information recording medium, multimedia information including at least one of audio information, image information and digital code data in an optically readable code form, said information recording apparatus comprising:

a recording head unit for printing a code associated with the multimedia information on the information recording medium;

driving means for moving the recording head unit in a first direction of the information recording medium, and for moving the information recording medium relative to the recording head unit in a second direction perpendicular to the first direction; and layout information input means for inputting layout information according to which the code is printed on the information recording medium, wherein predetermined processing is executed with respect to the code to be recorded, in accordance with the input layout information, such that the code is recorded on the information recording medium in a spatially independent tanner only by a single one-way scan operation of the recording head unit in the first direction, without moving the information recording medium and the recording head unit relative to each other in the second direction.

2. An information recording apparatus according to claim 1, wherein said layout information includes information relating to a position of the code on the information recording medium, and information relating to a width of the code as measured in the second direction, and wherein said predetermined processing is executed in accordance with the information relating to the position of the code and the information relating to the width of the code.

3. An information recording apparatus according to claim 2, wherein said predetermined processing includes dividing code information into components so as to enable the code to be recorded in a divided fashion.

4. An information recording apparatus according to claim 3, wherein said recording head unit also records identification information which indicates that each of the components is one of a plurality of divided code components constituting the code.

5. An information recording apparatus according to claim 4, wherein said identification information includes a number indicating an order of reading the divided code components.

6. An information recording apparatus according to claim 4, wherein said identification information comprises a frame recorded so as to contain all of the divided code components constituting the code.

7. An information recording apparatus according to claim 3, wherein said predetermined processing includes processing for permitting the divided code components based on information division to be recorded in the second direction.

8. An information recording apparatus according to claim 7, wherein said recording head unit also records a visual quasi-code between the divided code components based on the information division.

9. An information recording apparatus according to claim 2, wherein said predetermined processing includes processing for altering a record position where the code is recorded on the information recording medium.

10. An information recording apparatus according to claim 2, wherein said predetermined processing includes processing for varying a recording length of the code in the first direction.

11. An information recording apparatus according to claim 1, wherein said layout information includes width information relating to a width of the code as measured in the second direction, and wherein said predetermined processing is executed in accordance with the width information.

12. An information recording apparatus according to claim 11, wherein said predetermined processing includes dividing code information into components so as to enable the code to be recorded in a divided fashion.

13. An information recording apparatus according to claim 11, wherein said predetermined processing includes processing for altering a record position where the code is recorded on the information recording medium.

14. An information recording apparatus according to claim 11, wherein said predetermined processing includes processing for varying a recording length of the code in the first direction.

15. An information recording apparatus according to claim 1, wherein said layout information includes area information relating to an area in which the code can be recorded on the information recording medium, and wherein said predetermined processing comprises altering a size of the code to be recorded in accordance with the area information.

16. An information recording apparatus according to claim 15, wherein the size of the code to be recorded is altered in accordance with a type of the information recording medium.

17. An information recording apparatus according to claim 16, further comprising means for determining whether or not the code can be recorded after size alteration based on (i) the size of the code altered in accordance with the area information, and (ii) the type of the information recording medium.

18. An information recording apparatus according to claim 1, wherein the code comprises a set of two-dimensionally arranged separable blocks, and wherein each of the blocks includes at least a data dot pattern formed of dots arranged in accordance with a content of the multimedia information, and an address dot pattern indicating an address arranged in a predetermined relationship with respect to the data dot pattern.

19. An information recording apparatus according to claim 1, wherein said recording head unit comprises a line-type head having a longitudinal direction coinciding with the second direction.

* * * * *